US007129675B2

(12) United States Patent
Brecht

(10) Patent No.: US 7,129,675 B2
(45) Date of Patent: Oct. 31, 2006

(54) SYSTEM AND METHOD FOR BATTERY CHARGING

(75) Inventor: William B. Brecht, Seal Beach, CA (US)

(73) Assignee: Trojan Battery Company, Santa Fe Springs, CA (US)

( * ) Notice: Subject to any disclaimer, the term of this patent is extended or adjusted under 35 U.S.C. 154(b) by 284 days.

(21) Appl. No.: 10/491,306

(22) PCT Filed: Oct. 3, 2001

(86) PCT No.: PCT/US01/31141

§ 371 (c)(1),
(2), (4) Date: Mar. 29, 2004

(87) PCT Pub. No.: WO03/030331

PCT Pub. Date: Apr. 10, 2003

(65) Prior Publication Data

US 2005/0017684 A1    Jan. 27, 2005

(51) Int. Cl.
*H02J 7/00* (2006.01)
*H02J 7/04* (2006.01)
*H02J 7/16* (2006.01)

(52) U.S. Cl. ............... 320/137; 320/131; 320/130; 320/156; 320/161; 324/426; 324/427

(58) Field of Classification Search ............. 320/156, 320/161, 148, 137, 131, 130; 324/426, 427
See application file for complete search history.

(56) References Cited

U.S. PATENT DOCUMENTS

| 3,794,905 | A |   | 2/1974  | Long |   |
|-----------|---|---|---------|-----------------|---------|
| 3,936,718 | A |   | 2/1976  | Melling et al.  |         |
| 4,052,656 | A |   | 10/1977 | Lavell et al.   |         |
| 4,392,101 | A |   | 7/1983  | Saar et al.     |         |
| 4,418,310 | A |   | 11/1983 | Bollinger       |         |
| 4,503,378 | A | * | 3/1985  | Jones et al.    | 320/161 |
| 4,647,834 | A |   | 3/1987  | Castleman       |         |
| 4,742,290 | A |   | 5/1988  | Sutshin et al.  |         |
| 4,746,852 | A |   | 5/1988  | Martin          |         |
| 5,140,252 | A | * | 8/1992  | Kizu et al.     | 320/151 |
| 5,237,259 | A |   | 8/1993  | Sanpei          |         |
| 5,274,321 | A |   | 12/1993 | Matsuda         |         |
| 5,307,001 | A | * | 4/1994  | Heavey          | 320/125 |

(Continued)

FOREIGN PATENT DOCUMENTS

EP    0 005 841 A2    12/1979

(Continued)

OTHER PUBLICATIONS

"Charge batteries safely in 15 minutes by detecting voltage inflection points"; EDN Magazine; Sep. 1, 1994**.

*Primary Examiner*—Karl Easthom
*Assistant Examiner*—Alexis Boateng
(74) *Attorney, Agent, or Firm*—Christie, Parker & Hale, LLP

(57) ABSTRACT

A method for charging a lead acid storage battery to advantageously extend its life is described. The termination of a charging process is based upon an evaluation of the first derivative (dv/dt) and second derivative (d2v/dt2) of the applied charging voltage. By utilizing the first derivative (dv/dt) and second derivative (d2v/dt2) as charging criteria, an amount of overcharge is applied to the battery that takes into account the precise amount of amp-hours previously removed from the battery. A charger arrangement for performing a charging process of the invention also is described.

12 Claims, 15 Drawing Sheets

U.S. PATENT DOCUMENTS

| | | |
|---|---|---|
| 5,352,967 A | 10/1994 | Nutz et al. |
| 5,444,353 A * | 8/1995 | Shinohara et al. .......... 320/148 |
| 5,469,043 A | 11/1995 | Cherng et al. |
| 5,477,125 A * | 12/1995 | Ettel et al. ................. 320/156 |
| 5,554,920 A | 9/1996 | Kokuga |
| 5,600,226 A | 2/1997 | Falcon |
| 5,606,240 A | 2/1997 | Kokuga et al. |
| 5,629,601 A | 5/1997 | Feldstein |
| 5,635,820 A | 6/1997 | Park |
| 5,656,920 A | 8/1997 | Cherng et al. |
| 5,701,068 A | 12/1997 | Baar et al. |
| 5,739,667 A | 4/1998 | Matsuda et al. |
| 5,780,994 A | 7/1998 | Sizemore |
| 5,808,443 A | 9/1998 | Lundstrom |
| 5,900,718 A | 5/1999 | Tsenter |
| 5,998,970 A | 12/1999 | Ishimaru |
| 6,087,805 A | 7/2000 | Langston et al. |
| 6,114,833 A | 9/2000 | Langston et al. |
| 6,150,793 A | 11/2000 | Lesesky et al. |
| 6,300,763 B1 * | 10/2001 | Kwok ........................ 324/427 |
| 6,983,212 B1 * | 1/2006 | Burns ......................... 702/63 |

FOREIGN PATENT DOCUMENTS

| | | |
|---|---|---|
| EP | 0 444 617 A2 | 9/1991 |
| EP | 0 981 194 A2 | 2/2000 |
| GB | 2 120 472 A | 11/1983 |

* cited by examiner

SYSTEM AND METHOD FOR BATTERY CHARGING

CROSS-REFERENCE TO RELATED APPLICATION

This application is the National Stage of International Application No. PCT/US01/31141 filed 3 Oct. 2001 and claims the benefit thereof.

FIELD OF THE INVENTION

This invention pertains to a method for controlling the termination of a recharging process for flooded deep-cycle lead acid electric storage batteries. More particularly, it pertains to procedures which supply to such batteries a quantity of recharge energy which is directly related to the amount of energy discharged following the last preceding battery charge event. It also pertains to equipment for implementing such procedures.

BACKGROUND OF THE INVENTION

Rechargeable electric storage batteries of many different kinds are known, such as nickel-cadmium, nickel metal hydride, nickel-iron, lithium, silver-cadmium and deep-cycle lead acid batteries. Deep-cycle lead acid batteries differ from SLI (starting, lighting, ignition) lead acid batteries used, e.g., in conventional automobiles; SLI batteries are not designed or constructed to withstand repeated cycles of substantial discharge and recharge, and so are not rechargeable batteries in the sense of this invention.

It is known, such as from U.S. Pat. Nos. 4,392,101 and 4,503,378, that there are certain characteristics of a rechargeable battery, regardless of kind, which change during recharging of the battery in ways which signal either that the battery is fully charged or that it is at a relatively predictable point short of but near a state of full charge. Those patents, as well as other publications, describe equipment and techniques for monitoring those characteristics and for detecting certain events, conditions or states of them, and using such detections either to terminate the battery charging process or to continue charging for preset times or in preset ways. Those preset ways typically use charging processes different from those in use at the time of the detected event. Those charging event detection techniques are known as inflection analysis methods because they rely on the detection of certain inflection points in time-based curves which describe the change in battery voltage or battery current, e.g., during the charging process. While inflection analysis as described to date works well to control recharging of most kinds of rechargeable batteries, inflection analysis as heretofore described has been found not to serve satisfactorily for controlling recharging of flooded deep-cycle lead acid batteries in which the battery electrolyte is a liquid (typically sulfuric acid) unconfined in any supporting matrix such as a gel.

Flooded deep-cycle lead acid batteries are widely used as energy sources for electrically powered vehicles such as golf cars, fork lift trucks, and scissor lift vehicles. They also are used in uninterruptible power supplies in hospitals and other buildings and facilities, and as components of photovoltaic power installations. The reasons why inflection analysis techniques as heretofore described are not satisfactory for controlling recharging of flooded deep-cycle lead acid batteries can be understood from the use of such batteries in electric golf cars, as an example.

Electric golf cars are powered by sets of 4, 6 or so flooded deep-cycle lead acid electric batteries. At a given golf course, there is a fleet of such golf cars available for use by golfers. Different cars in the fleet may have older batteries in them than other cars in the fleet. Certain cars may be used more frequently than others. Some cars may be used longer on a given day than others. Some cars may be subjected to more strenuous usage conditions on a given day than others, depending on the circumstances of the using golfers or differences in traversed terrain, among other reasons. Also, it is well known that even if all batteries in the fleet are from the same manufacturer and are of the same nominal age, there still will be meaningful variations between batteries of kinds which can affect battery performance, life and, importantly, how they respond to recharging processes. As a consequence, at the end of a day when the golf cars in that fleet are to be recharged, there can be significant differences between the discharge states of the batteries from car to car, and consequent meaningful differences from car to car in how the batteries need to be charged. Fleet-wide uniform recharging procedures either will cause some batteries to be insufficiently recharged or, more likely, substantial numbers of the batteries will be materially overcharged. Material overcharge of such a battery reduces battery life. Very commonly, the persons employed to recharge fleets of golf cars have no understanding of the effects of substantial overcharge and how to determine when it is occurring. Therefore, it is desirable that the batteries used in electric golf cars be recharged by equipment and processes which avoid substantial overcharge and do so in ways which inherently accommodate and deal with differences between batteries due to discharge state, age, and manufacturing variations, among other factors.

Deep-cycle lead acid batteries are designed to withstand repeated cycles of substantial discharge from a fully charged state and of recharge from a discharged state to a state of full charge. As compared to other kinds of rechargeable batteries which do not use liquid electrolytes, the liquid acid electrolyte of flooded deep-cycle lead acid batteries presents special conditions which require that a given battery, or a given set of a small number of batteries repeatedly used in combination with each other, be recharged in a way which provides a controlled overcharge related in extent to the state of the battery at the time a recharge event is commenced. Stated differently, effective recharge of a flooded deep-cycle lead acid battery ideally should include a controlled overcharge determined by the amount of energy removed from (discharged by) the battery during its last preceding duty cycle (period of use following the last prior charging event). The reason is related to what happens to the liquid electrolyte during the prior duty cycle and the following recharge event.

As a cell of a lead acid battery discharges, the acid ions in the electrolyte move to the cell electrodes and oxygen atoms move from the active material of the cell into the electrolyte to form water with the electrolyte hydrogen ions. As a consequence, the electrolyte acid becomes progressively more diluted and its specific gravity progressively approaches 1.0 from a higher starting specific gravity. As the cell is recharged, that ion exchange process is reversed to produce regeneration of the electrolyte acid and the active material. If the electrolyte is present in the cell as a free liquid (i.e., the cell is flooded), as opposed to being present in a gel matrix, the regenerated acid, being heavier than the dilute electrolyte, sinks to the bottom of the cell as it is created. As the recharging process continues, more and more concentrated regenerated acid collects in the bottom of the cell. At the point at which the cell active material has been fully regenerated, the cell is theoretically fully recharged on a Coulombic basis. However, the cell is not in good condition for use to deliver stored electrical energy because of the stratification of the electrolyte. The electrolyte is not of uniform acidity throughout the cell and so the regenerated acid electrolyte is not in uniformly effective contact with the regenerated active material over the full area of the regenerated active material; if the cell were to be called upon to discharge at that point, the discharging electrochemical process will occur predominantly in the lower part of the cell where the electrolyte acid is overly concentrated. The cell will not discharge energy at the levels desired, and the over concentrated acid in the bottom of the cell will cause overly rapid degradation of the adjacent active material. The consequence is under performance of the cell in a manner which materially reduces cell life.

In the portion of the recharge process for a lead acid battery cell which immediately precedes full regenerative restoration of the active material, gas is generated in the cell as a normal part of the recharge process. The gas bubbles rise through the electrolyte to the top of the cell and, in the process, induce circulation (stirring) of the electrolyte in the cell. However, if the recharge process is terminated at the point of full regeneration of the active material, the amount of gas generation which will have occurred will be insufficient to stir the electrolyte adequately to cause it to be of uniform acid concentration (uniform specific gravity) throughout the cell. For that reason, it is common practice to continue the process of recharging a flooded deep-cycle lead acid battery beyond the point of full recharge, i.e., to extend the gas generation process for a time to achieve adequate stirring of the regenerated electrolyte. That is, the cell is intentionally overcharged.

Current practice is to overcharge such batteries, which include a number of cells, by a predetermined amount which is defined to be adequate to fully stir the electrolyte in the cell or cells which need the most stirring; that definition of the predetermined amount of overcharge is based on the assumption that the cell has been maximally discharged in its previous duty cycle and that the cell has certain properties of age, condition and temperature. However, as shown above in the discussion of the operation of a fleet of electric golf cars, that assumption is not apt for a substantial portion of batteries requiring recharge. As a result, reliance upon that assumption about the amount of overcharge to be applied in the terminal stages of recharging flooded deep-cycle lead acid storage batteries causes a substantial number, if not the majority, of such batteries to be meaningfully overcharged. Meaningful overcharge of such a battery, especially if repeated more than a few times, substantially reduces the effective life of such a battery.

The foregoing description provides a foundation for understanding how existing descriptions of inflection analysis techniques for controlling battery recharge processes are deficient when applied to the recharging of flooded deep-cycle lead acid storage batteries.

U.S. Pat. No. 4,392,101 is an early description of the use of inflection analysis in controlling recharging of rechargeable batteries. It teaches that rechargeable batteries in general have broadly similar response characteristics to recharging processes. It teaches that if battery voltage or current, e.g., is plotted graphically against time during recharge, the resulting voltage/time or current/time curves will have broad similarities. After initiation of the charge process, irrespective of the particular materials used to define a battery cell, those curves will manifest at least a pair of inflection points in which the graph line reverses curvature, i.e., is inflected. It is disclosed that those inflection points signal or denote different phases of the battery's response to applied charging energy and, for each type of cell, those inflections occur at relatively predictable times in the process, either before or at the time of the battery reaching a state of full charge. It is disclosed that the predictability of the inflection point occurrences is generally unaffected by (happens without regard to) factors such as the actual voltage of the battery, individual cell characteristics, individual charging history, or actual ambient temperature conditions. That patent discloses that the inflection points can be identified by observing the state or character of the first or second derivative with respect to time of the battery characteristic (voltage or current) being monitored. More particularly, it teaches that a graph of the second derivative will cross the zero axis (the sign of the derivative will change from positive to negative, or vice versa) at least twice during the charging process, and the second zero axis crossing of that derivative either will occur at the time the battery reaches full charge or will occur at some interval shortly before full charge is achieved. However, in the instance of lead acid batteries, that patent does not attempt to describe when the second time-based derivative of voltage occurs relative to full charge. The principal descriptions of that patent are in the context of nickel-cadmium batteries where recharging is terminated a preset time after that second zero-axis crossing of that derivative has been detected. Nickel-cadmium batteries do not use a variable density electrolyte which is present as a part of the chemical process and so such batteries do not benefit from or require any measure of overcharge.

U.S. Pat. No. 4,503,378 applies inflection analysis recharging controls to nickel-zinc batteries and discloses that, for that type of battery, recharging is to be terminated upon the occurrence of the second instance of sign change (zero axis crossing) of the second derivative of battery voltage with respect to time. It also observes that, at the same time as the second derivative crosses the zero axis from positive to negative, the value of the first derivative of battery voltage with respect to time is at a maximum or peak value, a fact which enables the second derivative's zero crossing to be confirmed.

The article titled "Charge batteries safely in 15 minutes by detecting voltage inflection points" appeared in the Sep. 1, 1994, issue of EDN Magazine. That article focuses principally upon fast recharging of nickel-cadmium batteries. It comments that inflection analysis also applies to lead acid batteries. In that connection, it states "In lead-acid batteries, the second dV/dt inflection occurs at a predictable interval before the batteries reach full charge, but from the battery's Ahr capacity rating, you can easily derive the duration of the incremental charging needed to achieve full charge." That statement does not contribute, for at least two reasons, to a solution to the problem of how to efficiently, reliably and effectively charge a flooded deep-cycle lead acid battery, without meaningfully overcharging it, in terms of the battery's true need for recharge. First, a lead acid battery's Ahr (ampere-hour) capacity rating is not a precise value which can be determined accurately from engineering information. Rather, it is a value which a battery manufacturer assigns to a model or type of battery as a result of business factors peculiar to the manufacturer, such as marketing objectives, warranty policies, and other factors. A battery's ampere-hour capacity rating is merely a manufacturer's statement of the expectable performance, perhaps under unspecified conditions, of an average battery of that kind or type. It has no reliable relation to the charging needs of a particular battery after completion of a particular duty cycle, i.e., its depth of discharge before experiencing a recharging event. Second, the ampere-hour capacity rating is a value which needs to be known from a source other than the battery itself. What is needed is a way to charge a flooded deep-cycle lead acid battery using information, derived from the battery itself, which describes the battery's discharge state and which is usable to overcharge the battery only enough to stir the regenerated electrolyte adequately.

Neither of the patents cited above nor the EDN Magazine article consider the state of battery discharge before a recharging process is commenced. They impart no knowledge about how information about that discharge state can be used to control recharge of that battery. However, apart from those descriptions it is known (such as from U.S. Pat. No. 6,087,805) to physically attach to a battery, such as a battery in a golf car, an integrating ampere meter (ampere hour meter) which travels with the battery at all times. When the battery is connected to a charger following the battery duty cycle, the "on board" ampere hour meter is connected to the charger so it can communicate to the charger the value of ampere hours removed from the battery during that last duty cycle. That information is applied in the charger to a computing and control device which computes the total charge to be delivered to the battery by multiplying the metered value of ampere hours by the desired factor (for example 1.10 or 110%) that has been found to produce sufficient stirring in the electrolyte. A computing and control device in the charger then monitors the ampere hours returned to the battery by the charger. When the calculated value for the charge return is reached, that computing and control device instructs the charger to terminate the charging process. While this approach is effective, it suffers from the added complexity of communicating data to the charger from the ampere hour meter which is associated with the battery. That approach also suffers from the added expense of equipping every battery, or every operational set of batteries, with its own captive ampere hour meter which must be specially constructed to survive in the environment of the battery. That approach is independent of inflection analysis and has apparent practical problems in the field.

It is apparent, therefore, that a need exists for the availability of equipment and procedures which can be used effectively, efficiently and reliably by persons having little or no knowledge of battery technology to adequately recharge flooded deep-cycle lead acid batteries without meaningfully overcharging any one or small group of batteries. Such equipment and procedures, to satisfy that need, should effectively address and conform to the actual recharge and electrolyte stirring needs of a battery or of a defined small group of batteries. The term "defined small group" means a number of batteries, such as those installed in a given electric golf car, which most probably will be of the same age, will have experienced the same usage history, and will have shared the same duty cycle in the interval between last being recharged as a group and the recharge event of interest.

SUMMARY OF THE INVENTION

In light of the foregoing, this invention addresses problem situations not heretofore resolved in the art to provide procedures and equipment by which flooded deep-cycle lead acid batteries, individually or in defined small groups, are rechargeable in terms of actual recharge requirements and minimal overcharge processes. The invention applies inflection analysis principles in new ways to customize each battery charging event to the needs of the battery, or battery set, presented to the charger which includes a novel computing and control device. These benefits and advantages are provided and achieved effectively and reliably without calling for any change in how the battery is made or used. Service personnel are required only to connect and to disconnect the charger to and from the battery.

Information about recharge requirements is obtained by the charger from the battery itself in the course of the charging process, without reliance upon an ampere hour meter matched to the battery. That is, the charger does not know, and does not need to know, the discharge state of the battery before the recharging process is commenced. The invention is maximally protective of the batteries themselves and can lead to extended battery life.

In terms of procedure, the invention provides a method for charging lead acid batteries. The method includes monitoring the battery voltage during the performance of the process, recording the charging time, and monitoring the charge provided to the battery in ampere hours. The method also includes determining a point in the charging process at which the battery has a charge state having a known relation to a full charge state, and determining the quantity of charging energy deliverable to the battery beyond a point of full charge which is equal to a desired portion of the energy deliverable between commencement of the process and the point at which the battery is fully charged.

In terms of its structural aspects, the invention provides a charger for charging lead acid batteries, preferably deep cycle lead acid batteries. The charger includes a DC current source, a voltmeter, an ammeter, a timer, a dv/dt measurement circuit, and a $d^2v/dt^2$ measurement circuit.

More specifically, the charger also includes a controller coupled to the DC current source, the ammeter, the voltmeter, the timer and the dv/dt and $d^2v/dt^2$ measurement circuits. The controller is configured to determine the time in a battery recharge event when a battery is at substantially a predetermined percentage of full charge and to determine the value of $Q_D$ from the relation $(Q_S/p)=[Q_D/(1+x)]$ in which $Q_S$ is the ampere-hours of charging energy delivered to the battery in the interval from the beginning of the event to the time at which $d^2v/dt^2=0$ and dv/dt is maximum, p is the decimal equivalent of the percentage of replenishment charge delivered to the battery when $d2_v/dt^2=0$, x is the decimal equivalent of a desired percentage amount of replenishment charge to be delivered to the battery as an overcharge amount, and $Q_D$ is the ampere hours to be delivered to the battery from the beginning of the event to reach the overcharge amount. If the predetermined percentage of full charge is 98%, then p=0.98.

DESCRIPTION OF THE DRAWINGS

These and other features and advantages of the present invention will be better understood from the following detailed description read in light of the accompanying drawings, wherein.

GLOSSARY

Full charge $Q_F$: the state of a battery at which it is at full charge capacity and continued application of charging energy has no beneficial effect upon the electrodes or upon electrode active materials;

Initial state of charge $Q_i$: the amount of residual charge possessed by a battery at the commencement of a battery recharge event or process;

Replenishment charge $Q_R$: the amount of charging energy, measured in ampere-hours, absorbed by the battery having an initial state of charge to return the battery to a state of full charge; $Q_R = Q_F - Q_i$ Charge deficiency: the difference between a battery's fill charge and initial state of charge; it is equal to the replenishment charge $Q_R$ Overcharge $Q_o$: the amount of charging energy, measured in ampere hours, delivered to a battery in the course of a recharge event or process after the time the battery achieves full charge until the termination of the event or process; it is extra energy delivered to the battery to condition the battery for good performance during its next duty cycle; in the practice of this invention, its magnitude is directly related to the magnitude of the replenishment charge;

Duty cycle: the period after a battery has been fully recharged during which the battery delivers energy during use of the thing in which the battery is located or to which it is connected; the battery charge at the end of a duty cycle is the battery's initial state of charge in the following battery recharge event or process;

Coulombic charge $Q_C$: the amount of charge possessed by a battery at any time of interest;

Delivered charge $Q_D$: the ampere hours of energy delivered to a battery during the interval between commencement and termination of a battery recharge event or process; in the practice of this invention it is the combination of the replenishment and overcharge ampere hours, i.e., $Q_D = Q_R + Q_O$;

Signal charge $Q_S$: the amount of charge, measured in ampere hours, delivered to a battery during the interval beginning with the commencement of the recharging process and ending at that later point in the process at which the battery, due to its particular electrochemistry, has a detectable condition indicative that the battery charge level has a definite relation to full charge; in the context of this invention which pertains to lead acid battery electrochemistry, the detectable condition is a zero value of the second time-based derivative of battery voltage coexisting with a maximum value of the first time-based derivative of battery voltage.

DETAILED DESCRIPTION OF THE INVENTION

Figure 1A:
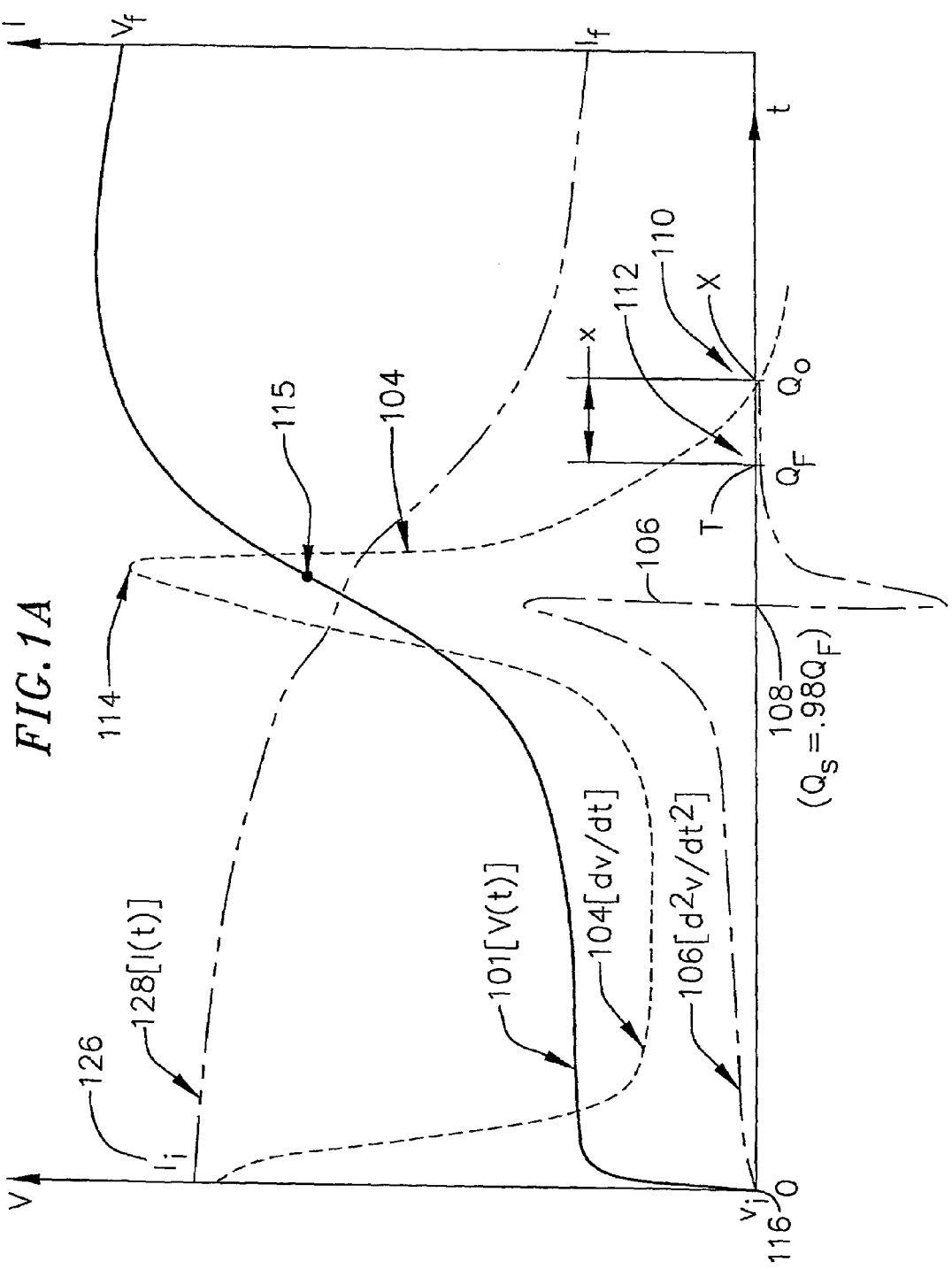
FIG. 1A is a graph of aspects of voltage and current at the terminals of a lead acid storage battery being charged with a conventional ferroresonant charger, graphed over time during a typical charging cycle.

FIG. 1A is a graph of aspects of the voltage and the current at the terminals of a lead acid storage battery being charged with a conventional ferroresonant charger graphed over time during a typical charging cycle; the graphed aspects are voltage, current, and the first and second derivatives of the voltage with respect to time. Such a charging characteristic is typically observed when charging a lead acid battery with a ferroresonant battery charger. A ferroresonant charger typically includes a transformer and rectifier circuit that contributes to the distinctive shapes of the curves describing the way the current 128 and voltage 101 vary during a battery charging event. In implementing a charging cycle the duration of the charging cycle and the rate at which recharging energy is applied to the battery determines the amount of charge returned to the battery. To fully charge a flooded lead acid battery, a typical method utilized is to continue to charge, i.e., to overcharge, the battery after it has reached a state where charging current flowing into the battery has decreased significantly.

Controlling overcharge of a lead acid storage battery to a fixed percentage of ampere hours removed from the battery during an immediately previous duty cycle typically tends to greatly increase a battery's lifetime. Overcharge parameters are typically selected based upon varying criteria known to those skilled in the art. A battery thus charged to a fixed percentage of ampere hours removed in the prior duty cycle typically may have a longer useful life than a comparable battery which receives, each time it is recharged, an amount of overcharge defined as a fixed percentage of the total charge capacity of the battery. Thus, knowledge and use of the initial battery discharge state when recharging begins aids in determination of the amount of overcharge best delivered to the battery.

A voltage response 101 during charging of a lead acid storage battery is shown as a function of time in FIG. 1A. The voltage measured is that present across the battery's terminals at various times during the charging cycle. A particular voltage response 101 for each charging cycle of a battery, in response to a given value of an impressed charging current 128, changes as a function of the battery's temperature and internal conditions, which normally are a function of a battery's age. Neither the temperature nor the age of a battery are known by atypical charging device. Thus, the basis for judging the charge deficiency of a battery connected to a charger may not be reliably based on an absolute value of voltage.

A determination of the ampere hours of battery charge deficiency is more reliably based upon inherent voltage-time characteristics of flooded lead acid storage batteries. The inherent voltage-time characteristics preferably utilized (see FIG. 1A) are voltage as a function of time V(t) (curve 101), the rate of change of voltage over time dv/dt (curve 104), and the acceleration of the voltage over time $d^2v/dt^2$ (curve 106).

A battery's voltage V(t), as measured across its external terminals, varies during a charging cycle in response to an impressed charging current I(t) (curve 128 in FIG. 1A). A voltage across the terminals of a battery being charged and a charging current into the battery are related by a battery's internal resistance and back EMF (open circuit voltage) that typically varies during a charging cycle.

At a given time, a battery's internal resistance is determined by a series of conductive elements that make up a battery's cell structure disposed in the battery's electrolyte. At initiation of a charging cycle, or t=0 (see point 116 in FIG. 1A), the initial battery voltage $V_i$ is the open circuit voltage. At initiation of the charging cycle, the current supplied by a charger typically is at its highest value $I_i$ (point 126) during a charging cycle.

During a typical charging process, battery voltage 101 is initially at a low value $V_i$, rises rapidly to an intermediate voltage from which the voltage continues to rise slowly for a period of time, after which the voltage rises rapidly again with an increasing slope where it finally levels to a final fully charged voltage $V_f$. As the battery is charged, the battery back EMF rises due to heat generated in the charging process and due to rising specific gravity of the electrolyte. As the battery charges, current 128 supplied by a charger decreases as the battery voltage 101 increases in step with the increasing battery impedance.

In the final stages of charging, a further increase in battery back EMF is caused by the electrolytic generation of hydrogen and oxygen gas as the electrolyte decomposes in response to the applied energy; that phenomenon is called "out gassing". Out gassing occurs as the battery nears and reaches a state of full charge, and its components can no longer accept recharging energy in a regenerative way. As the out gassing process stabilizes, the voltage across the battery's terminals remains essentially constant and approaches its final value.

In the final stages of charging, a slight increase in battery terminal voltage 101 appears due to an electrolyte stirring effect. The electrolyte stirring effect is caused by the out gassing process. The stirring effect causes the electrolyte within each of a series of cells in the battery to become substantially homogeneous, i.e., of uniform specific gravity (acid concentration), stabilizing the battery back EMF within each cell. It is often desirable to design a battery charging system that takes a battery's internal construction, and the charging process into consideration in order to provide a desirable charging process.

Battery chargers are constructed utilizing various types of circuit designs. Circuit designs of chargers include ferromagnetic and switching techniques. The various types of battery chargers are also designed to provide one or more charging processes called "profiles" or "algorithms" that are compatible with the circuit design of the charger. Profiles are also often selected to take advantage of the internal changes in the battery during charging in an attempt to extend battery life.

A charger which has a termination scheme keyed to dv/dt=0 typically provides 118% to 124% of the charge previously taken out of the battery.

Continuing with reference to FIG. 1A, the first derivative 104 and the second derivative 106 of voltage with respect to time provide additional information concerning a battery's desired charging requirements. In addition, the first and second voltage derivatives provide distinct transitions of state that are easily detected. The information provided by those first and second derivatives provides reliable criteria that are unique to an individual battery, so that the charging profile may be tailored to that particular battery. By basing a battery's charging process on selected aspects of the first 104 and second 106 derivatives of the voltage response 101 curve, a charging process may be implemented that takes into account a battery's unique and individual charging requirements to provide an amount of overcharge that is appropriate for a particular battery during a particular charging event.

In FIG. 1A, a voltage characteristic V(t) of an exemplary flooded deep cycle lead acid storage battery undergoing a charging cycle, controlled by a conventional ferroresonant charging process, is depicted by curve 101. At the end of the charging cycle, the interrelation between the voltage curve 101 and its first (dv/dt) 104 and second ($d^2v/dt^2$) 106 derivatives can provide a useful indication of the time that at which the battery actually is at a certain state compared to a state of full charge. That certain state for a flooded lead acid battery is the state at which the battery is at about 98% of full charge. In FIG. 1A, that state is identified by point 108 on the horizontal time base of the graph.

In the voltage curve 101, the voltage increases over time until the end of the charging cycle. Prior to the end of the charging cycle, the voltage curve begins to rise rapidly before topping out and decreasing. During the rapid increase, curve 101 has an inflection point 115 at which the voltage ceases to accelerate and begins to decelerate. In the corresponding curve 104 plotting the first derivative of V(t), a maximum value 114 of the first derivative of V(t) occurs at the same time as the occurrence of the inflection point 115 of V(t). The first derivative (dv/dt) of the voltage curve 101 does not again rise to a peak. This maximum 114 of dV/dt provides a more accurate indication of the 98% charging point 108 than does voltage inflection point 115.

The curve 104 depicting the changes in the first derivative (dv/dt), or rate of change of the voltage versus time, of a lead acid battery undergoing ferroresonant charging, is characterized by a curve 106 having two response peaks. Initially, the first derivative 104 has a high value corresponding to a swiftly changing battery voltage. Next the curve 104 of rate of change of the battery voltage decreases as the voltage curve 101 goes through a period of slight change. The small values of rate of change are followed by a second rapid increase in the rate of change that peaks at 114 and then falls off. The peak 114 corresponds to the voltage curve 101 inflection point 115, where a maximum slope is measured. The inflection point 115 in the voltage verses time curve 101 where the voltage is changing the fastest has a corresponding maximum 114 on the first derivative curve 104. After the first derivative maximum has been reached, the rate of change 104 of the voltage 101 decreases.

The second derivative ($d^2v/dt^2$) of the voltage versus time function of the lead acid battery undergoing ferroresonant charging is shown by curve 106. The second derivative describes the rate of change of curve 104, which in turn describes rate of voltage change. Thus, curve 106 describes how the value of voltage applied to the battery terminals accelerates and decelerates during the battery charging process. As can be seen from the second derivative curve 106, the second derivative is zero when the first derivative curve 104 reaches a point where its slope is instantaneously equal to zero, such as at the previously described maximum 114.

The point in time at which the first derivative reaches a maximum value and the second derivative has a value of zero very accurately identifies the point 108 in time when 98% of the ampere-hours previously withdrawn from the battery have been returned to it. The abrupt change of the second derivative ($d^2v/dt^2$) from a positive to a negative value is easier to accurately identify than the gradual change in value of the first derivative.

Point 108 on curve 106 occurs at different times (t) for different batteries because this characteristic is related to the initial state of discharge, age and temperature characteristics of an individual battery. However, point 108 corresponds to the time in the charging process where an impressed current 128 is nearly all being used to produce gas. That point is used as a signal in the practice of this invention, and the charge which has been returned to the battery at that point, measured from the beginning of the pertinent recharge event, is denominated as the as the signal charge $Q_S$. Knowledge of the magnitude of $Q_S$ and of its relation to battery full charge $Q_F$, together with the amount of overcharge $Q_o$ desired, enables the total deliverable (delivered) charge $Q_D$ to be determined and enables the charging process to be controlled accordingly. If the battery is a flooded lead acid battery at 80° F., $Q_S$=0.98 $Q_F$. If the battery is at some other temperature, the relation of $Q_S$ to $Q_F$ can be different, but if the battery temperature is not a temperature significantly below room temperature, then use of the relation $Q_S$=0.98 $Q_F$ has been found to be workable and to produce significant improvements.

Charge delivered to a battery can be measured in ampere-hours ("amp-hours"). One ampere-hour is the quantity of charge delivered to the battery in one hour by a one ampere current. Thus, a completely drained battery having a charge capacity specified in ampere hours will take a number of hours equal to the specified ampere-hour capacity to return the battery to a fully charged state to capacity, or a desired fraction of full charge, at a one ampere charging current.

The specified amount of overcharge $Q_O$ beyond full charge $Q_F$ is selected to provide an increased battery life. In an exemplary embodiment the overcharge quantity is chosen to be 108% of the replenishment charge $Q_R$. That is, in FIG. 1A, X is the time when 8% more than the replenishment charge has been delivered to the battery and is the time when the recharge event for that battery is terminated.

The amount of charge usefully returned to a battery to achieve the desired conditioning may be found by the following relation:

(specified % overcharge)(ampere-hours from start of charge to 98% of full charge)=(ampere-hours from initial charge to reach specified overcharge)(98%)).

Stated differently using the terms defined above, $$Q_S/0.98=Q_D/(1+x) \quad \text{(Equation 1)}$$

where x is the decimal equivalent of a percentage of the replenishment charge $Q_R$ to be delivered to the battery as an overcharge amount. A workable and preferred value of x is 0.10.

Time T, point 112 in FIG. 1A, is the point in time at which the battery is fully charged, i.e., has charge level $Q_F$. Charge amount $Q_S$ is found from determining the second derivative's zero crossing. Thus, the total charge $Q_D$ to be delivered during the recharge event may be found once $Q_S$ has been found by analysis of the dynamic aspects of the charging characteristic curves.

The amount of overcharge to be delivered to the battery to obtain the desired degree of conditioning by gaseous stirring of this liquid electrolyte preferably is in the range of from about 8% to about 12%, and most preferably is about 10%.

Figure 1B:
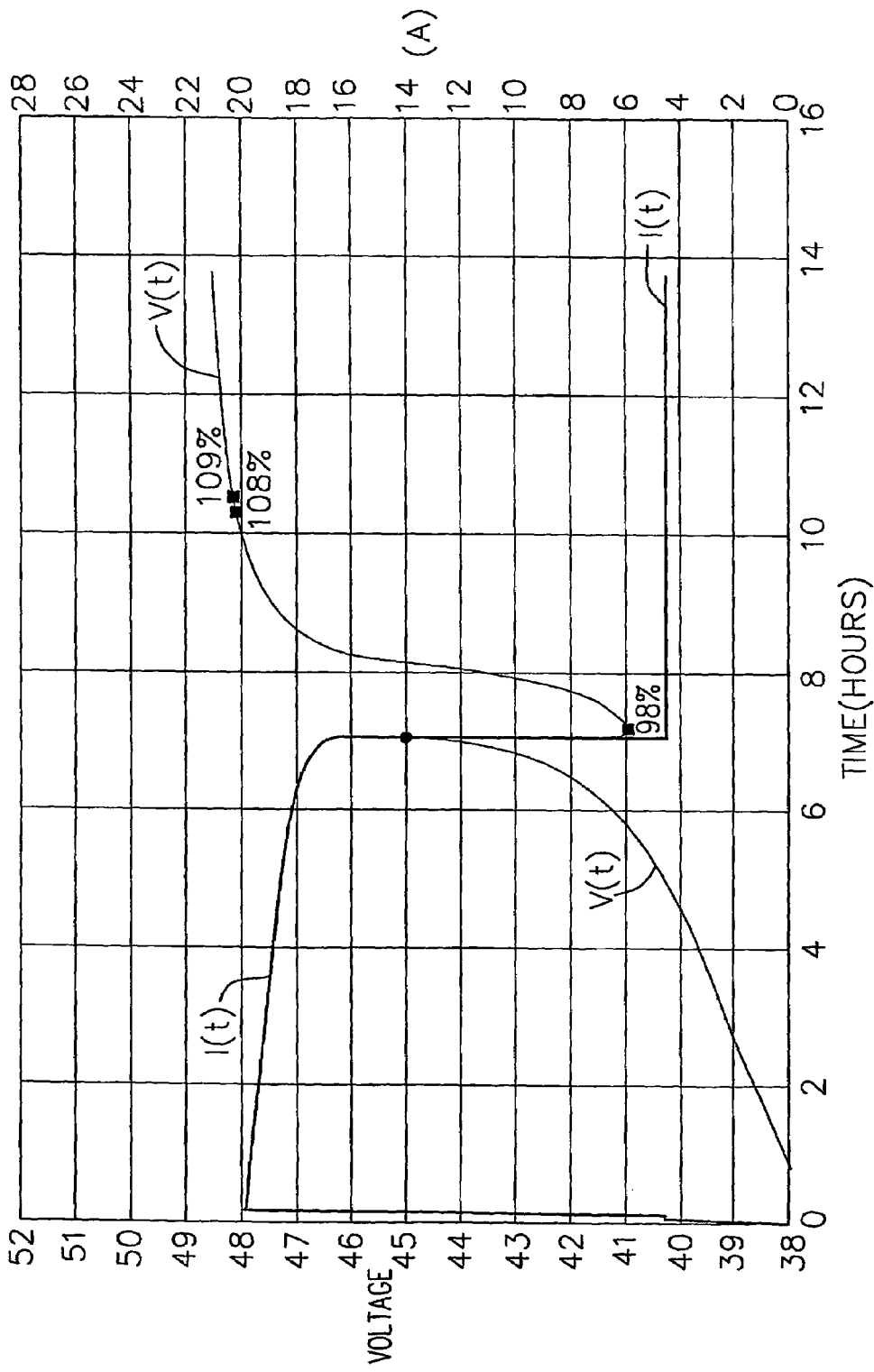
FIGS. 1B and 1C are graphs for the charging profile of similar batteries at 80 degrees Fahrenheit and 122 degrees Fahrenheit respectively following a duty cycle discharge of about 135 ampere-hours.
Figure 1C:
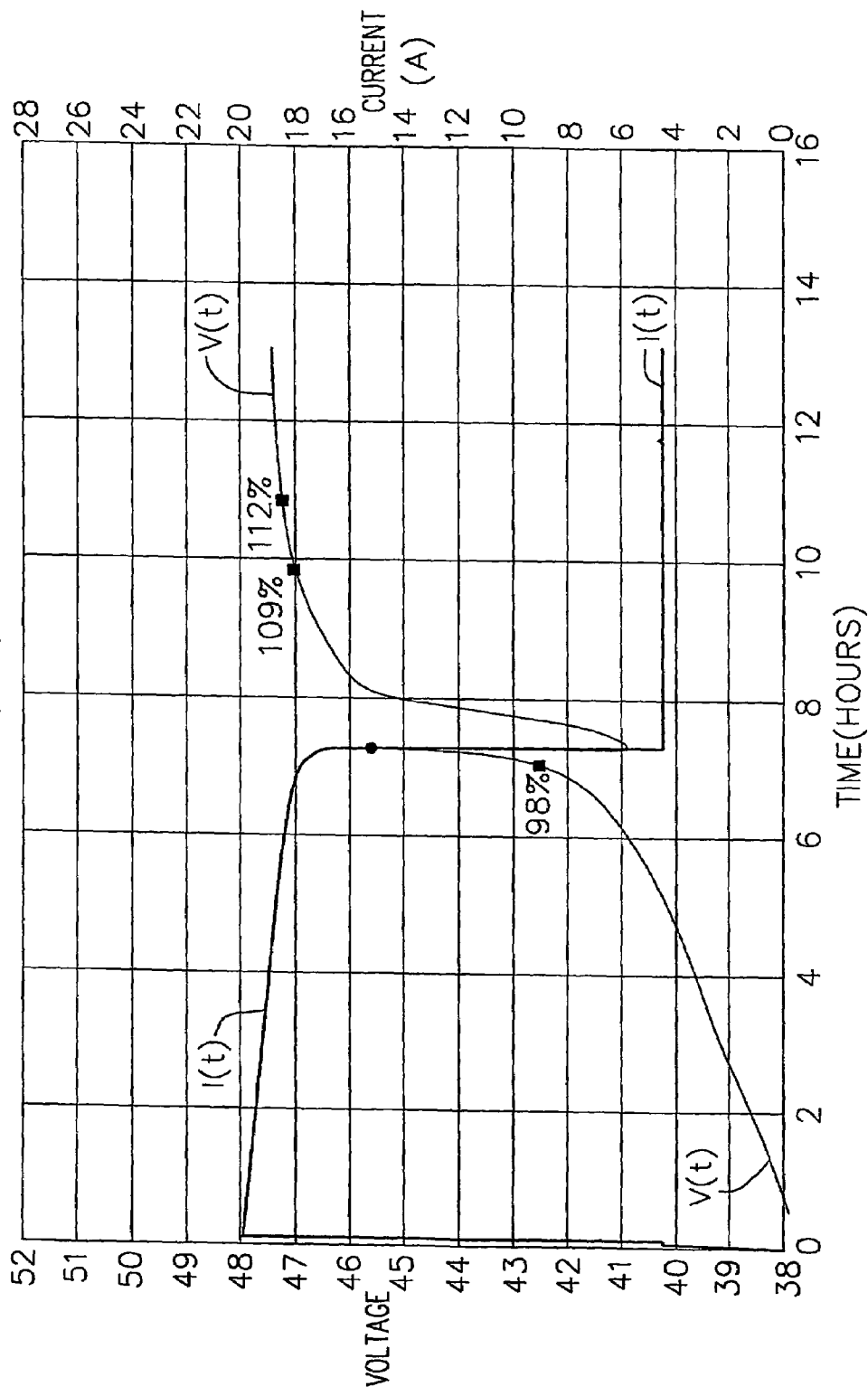

FIGS. 1B and 1C are graphs for the charging profile of a battery at 80 degrees Fahrenheit and 122 degrees Fahrenheit, respectively; while any profile desired can be used, the preferred profile is a constant power profile. In these cases, the battery delivered 135 or 136 ampere-hours before the commencement of the respective recharge events. The points in time where 98% and other percentages of the charge deficiency has been returned to the battery are marked on each graph. A hot battery having a temperature of 122 degrees Fahrenheit reaches the 0.98 $Q_F$ signal point earlier in time than when the second derivative of the charging voltage is zero valued. However, the temperature-based shift in the occurrence of $d^2v/dt^2$=0 relative to 98% of full charge is slight. Use of $Q_S$=0.98 $Q_F$ for such a very hot battery results in far less overcharge of the battery than would otherwise occur.

Figure 1D:
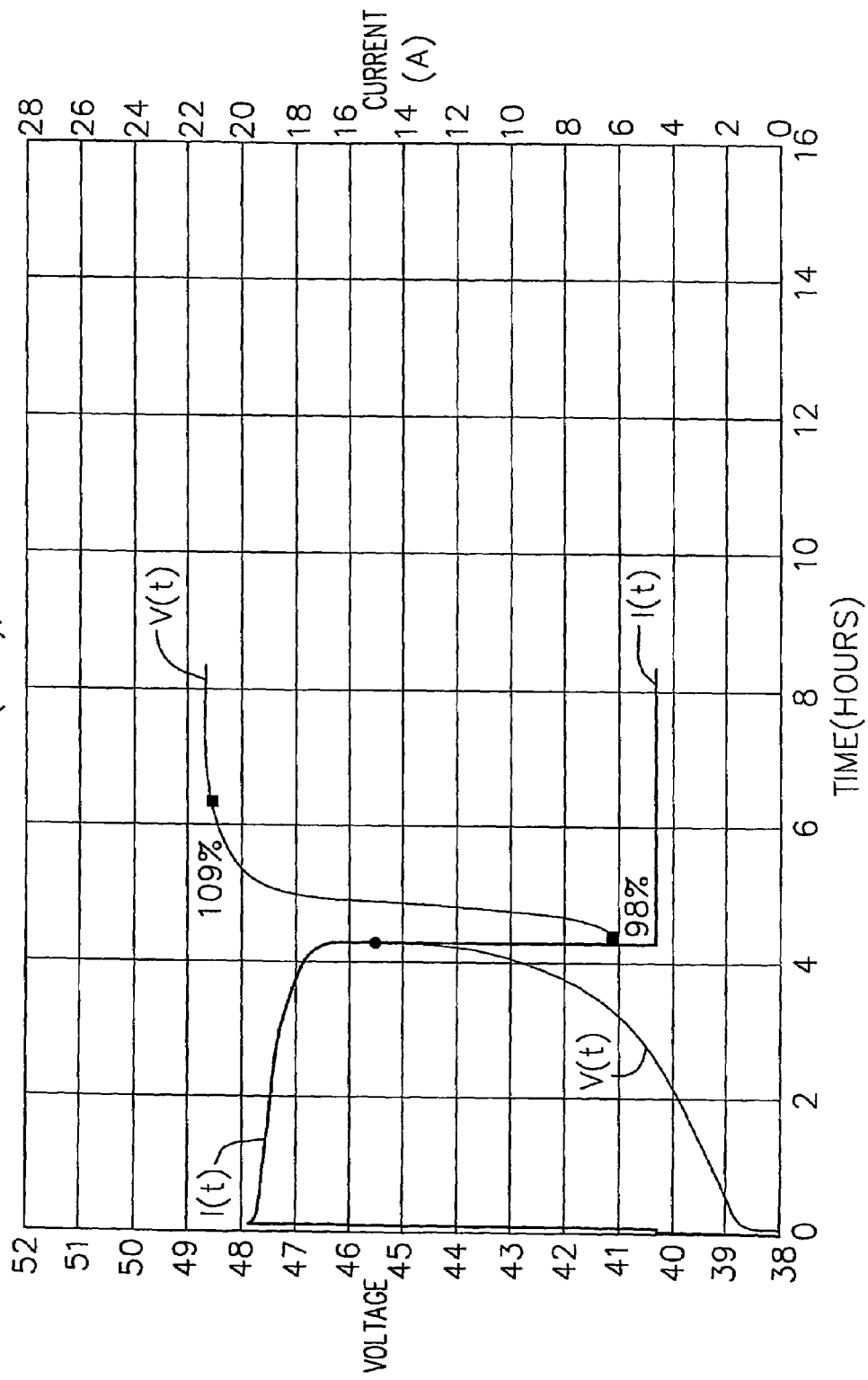
FIGS. 1D and 1E are graphs for the charging profile of similar batteries at 80 degrees Fahrenheit and 48 degrees Fahrenheit respectively following a duty cycle discharge of about 81 ampere hours.
Figure 1E:
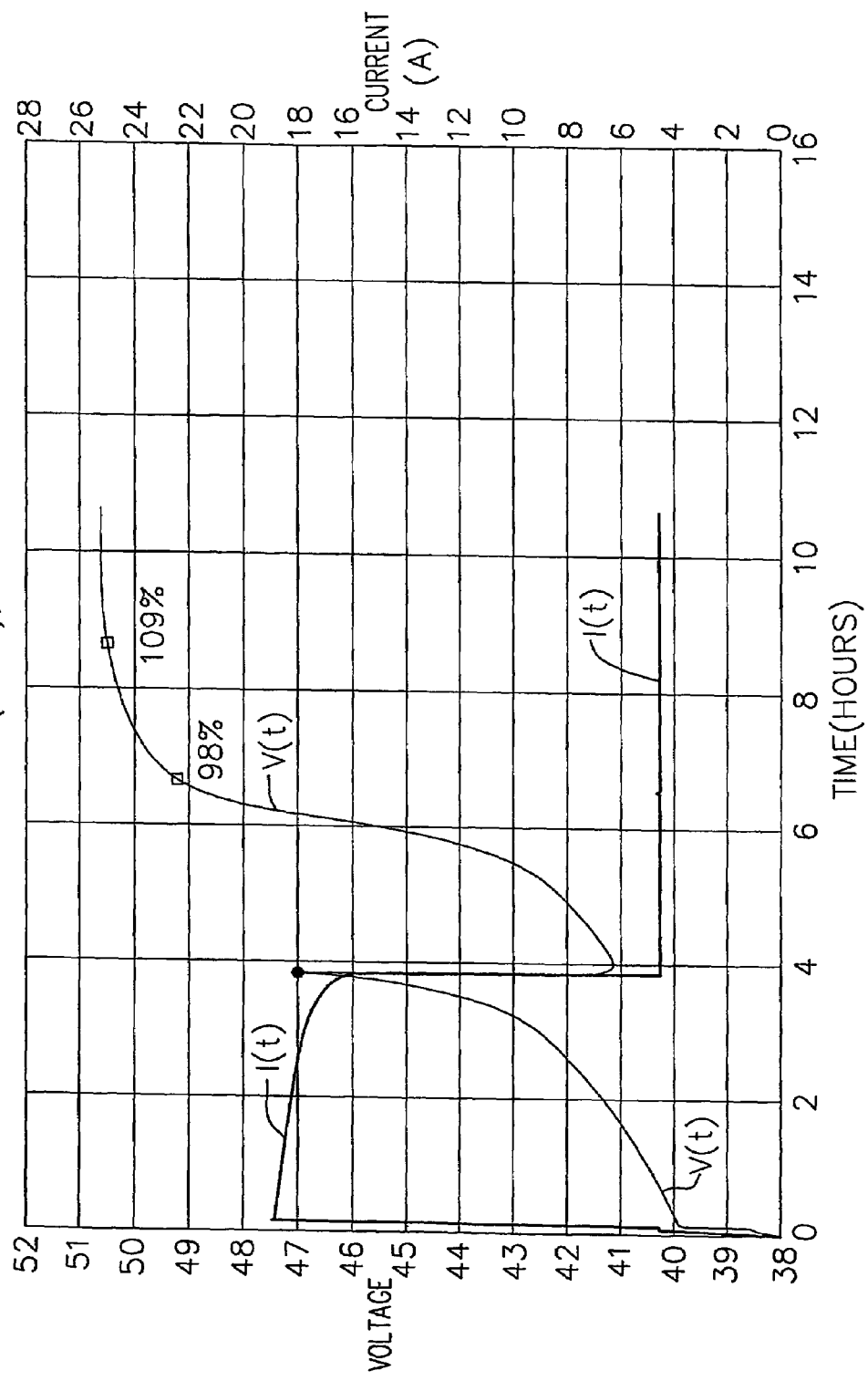

FIGS. 1D and 1E are graphs for the charging profile of a battery at 80 degrees Fahrenheit and 48 degrees Fahrenheit respectively. In these cases, the battery delivered 81 and 82 ampere-hours before commencement of the charging events. The points in time where $Q_C$=0.98 $Q_F$ and $Q_C$=1.09 $Q_R$ are marked on each graph. As can be seen from those graphs, the cold battery's signal point is shifted to the right along the voltage curve. For example, a cold battery will be at less than 98% of full charge at the point in time when the second derivative of the charging voltage is zero valued. When the second voltage derivative for the cold battery is zero valued, only 82% of the full charge has been returned to the battery. In such a situation, use of the relation $Q_S$=0.98 $Q_F$ produces a measure of undercharge to the battery but does not meaningfully harm the battery. Over a typical industrial temperature range, the percent of charge returned to a battery at the time $d^2v/dt^2$=0 will typically vary from 84% to 102% of its total charge capacity $Q_F$.

A straightforward way to factor temperature into a process is to directly measure it and include it as a factor in the process. However, adding a temperature sensor which is effective to measure a battery's internal temperature is expensive and adds to a typical charging system another level of complexity that is undesirable in producing a low cost charging system that possesses an increased reliability.

Figure 2:
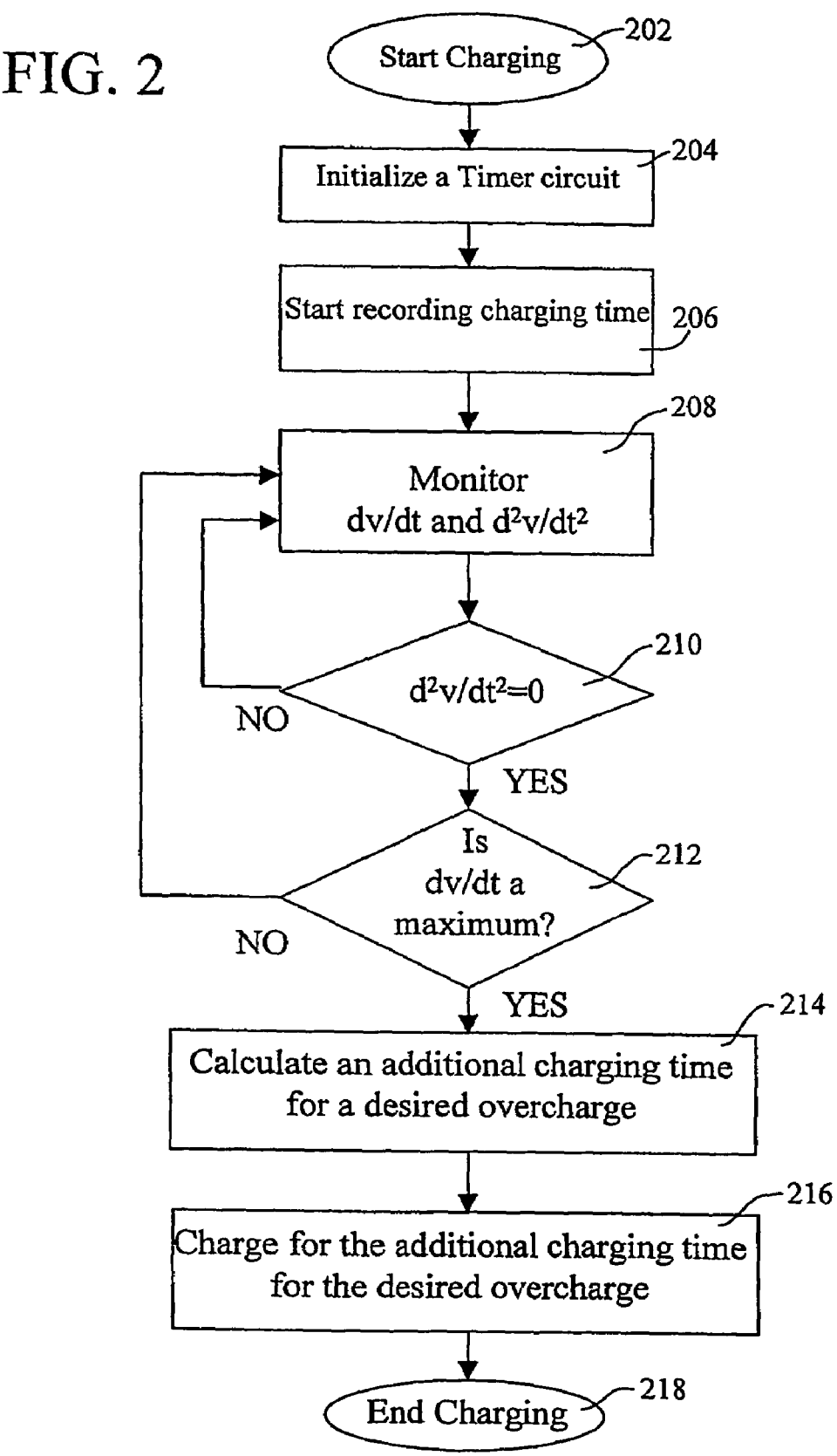
FIG. 2 is a flow diagram of an embodiment of a charging process for a flooded deep cycle lead acid storage battery.

FIG. 2 is a flow diagram of an exemplary charging process for a lead acid storage battery. In order to determine and utilize first and second derivative information corresponding to the 98% charge point of a battery, a process to determine the relevant information is executed. Such a process is implemented, for example, as a program set of instructions that drive a computer, microprocessor or other controlling device that comprises a battery charging system and preferably is part of the battery charger. The instructions may be stored in volatile or non-volatile memory or on a mass storage medium.

At the beginning of the process, a command 202 is initiated to start the charging process. In the next step, a timer circuit is initialized 204. In an alternative process, the timer circuit can be implemented in software, such as would be used to direct a microprocessor to time an operation, or sequence of operations. The time is recorded at step 206 so that when the desired voltage conditions are reached, an elapsed time will be known. Next, monitoring of the first derivative of the voltage and the second derivative of the voltage is initiated at step 208. The value of the second derivative is evaluated at step 210. If the second derivative is not equal to zero, the process continues to monitor the second derivative at step 208. If the second derivative is equal to zero, the process continues to the evaluation made in step 212. At step 212, the first derivative of the voltage is monitored to determine if it has reached a maximum value. If it has not, it is continued to be monitored at step 208. If dv/dt is determined to be a maximum value at step 212, process flow branches to step 214. At step 214, the measured time to reach 98% of full charge is applied and an additional charging time is computed so that a desired percent of overcharge may be added to the battery. Performance of step 214 includes use of information from the timer and information about total amperes delivered to the battery to compute $Q_S$, and to compute $Q_D$ using the relations described above and program parameters defining the desired value of x (percentage overcharge) and $Q_S/Q_F$.

In an embodiment of the invention, the evaluations performed at steps 210 and 212 may be interchanged without affecting the outcome of the process. Additionally, determination of the maximum of the first derivative of the voltage performed in exemplary step 212 may be done continuously or by utilizing sampling methods known to those skilled in the art.

After the initial charging time, from initiation of the charging cycle until $d^2v/dt^2=0$, has been determined and the additional amount of time to provide a desired overcharge is calculated at step 214, the process (step 216) directs the battery to be charged for an additional amount of time to provide the desired overcharge. After the additional charging time has elapsed, the charging cycle is stopped at step 218.

A relation which is useful to determine when a battery recharging process according to this invention is to be terminated is as follows:

$$Q_S/0.98 = Q_D/(1+x)$$

in which $Q_S$ and $Q_D$ are as defined above (see Glossary), and x is the decimal equivalent of the percentage of the replenishment charge $Q_R$ to be applied to the battery, after it is fully charged, to achieve the desired conditioning (electrolyte stirring) of the battery.

It is apparent that the difference between $Q_D$ and $Q_S$ is the quantity of charging energy which remains to be delivered to the battery in the course of the battery recharging event between the time the point of 98% of full charge of the battery is detected and the time at which the recharge event is ended. Thus, the quantity of charging energy to be delivered to the battery after charging energy amount $Q_S$ has been delivered can be determined by evaluation of the following expression:

$$Q_S\{[1+x)/0.98]-1\}.$$

This is true because $Q_D = Q_S(1+x)/0.98$.

Assume that the full charge of a battery is 1000, and the desired overcharge percentage is 8%. If a battery is 50% discharged at the beginning of a recharge event, $Q_S=0.98$ (1000−500)=490, and so $Q_D=540$. $Q_i+Q_D=500+540=1040$, and so the actual amount of overcharge at termination of the recharge event is 40.

Applying the same assumptions to a battery which is at 25% capacity ($Q_i=250$) when recharging begins, $Q_S=0.98$ (1000−250)=735, $Q_D=810$, $Q_i+Q_D=250+810=1060$, and so the delivered overcharge is 60. Similarly, if the battery is at 70% of capacity when recharging begins, $Q_S=0.98$ (1000−700)=294, $Q_D=324$, $Q_i+Q_D=700+324=1024$, and so the delivered overcharge is 24.

It will be recalled that if a battery is very deeply discharged when its recharging event begins, the specific gravity of the acid electrolyte is low (near 1.00) due to the highly diluted state of the electrolyte. The more dilute the electrolyte when recharging begins, the greater will be the density stratification of the electrolyte at full charge, and so the more the electrolyte needs to be stirred by gas generation to properly condition the battery by making the electrolyte substantially homogenous through the battery cells. Conversely, if a battery is relatively lightly discharged when its recharging event begins, the acid electrolyte will have a higher starting specific gravity, a lower density stratification at full charge, and a lower need for electrolyte stirring to properly condition the battery. The foregoing examples show that this invention delivers to a recharged battery only that amount of overcharge which is determined to be needed for proper conditioning and does not excessively overcharge the battery. The amount by which the battery is overcharged is a function of the discharge state of the battery when recharging begins. The point at which the recharging process is ended is determined from information obtained from the battery itself. That is a characteristic of the battery recharge processes illustrated in FIGS. 2–7.

Figure 3A:
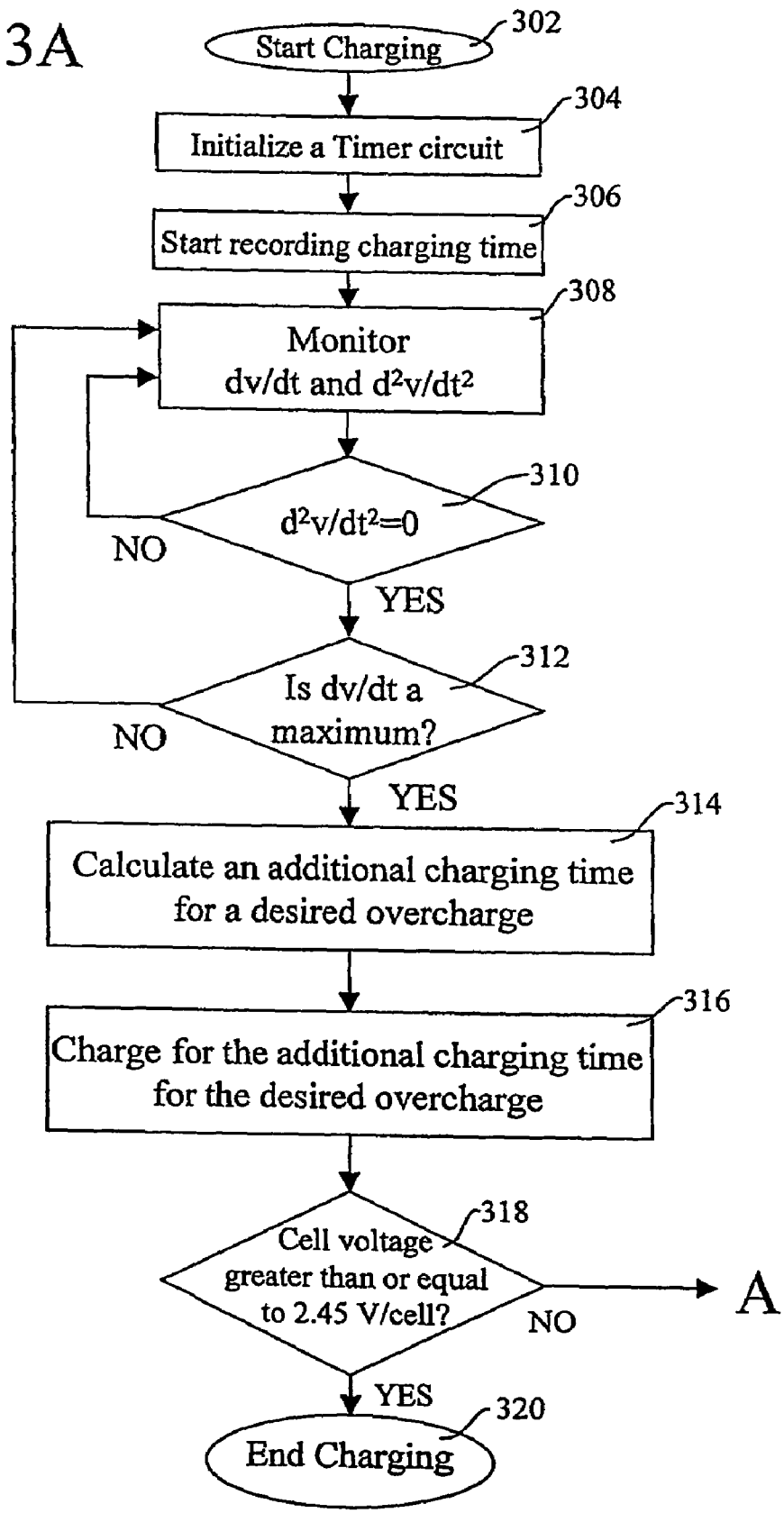
FIGS. 3A and 3B are flow diagrams of an embodiment of a charging process that monitors cell voltage.
Figure 3B:
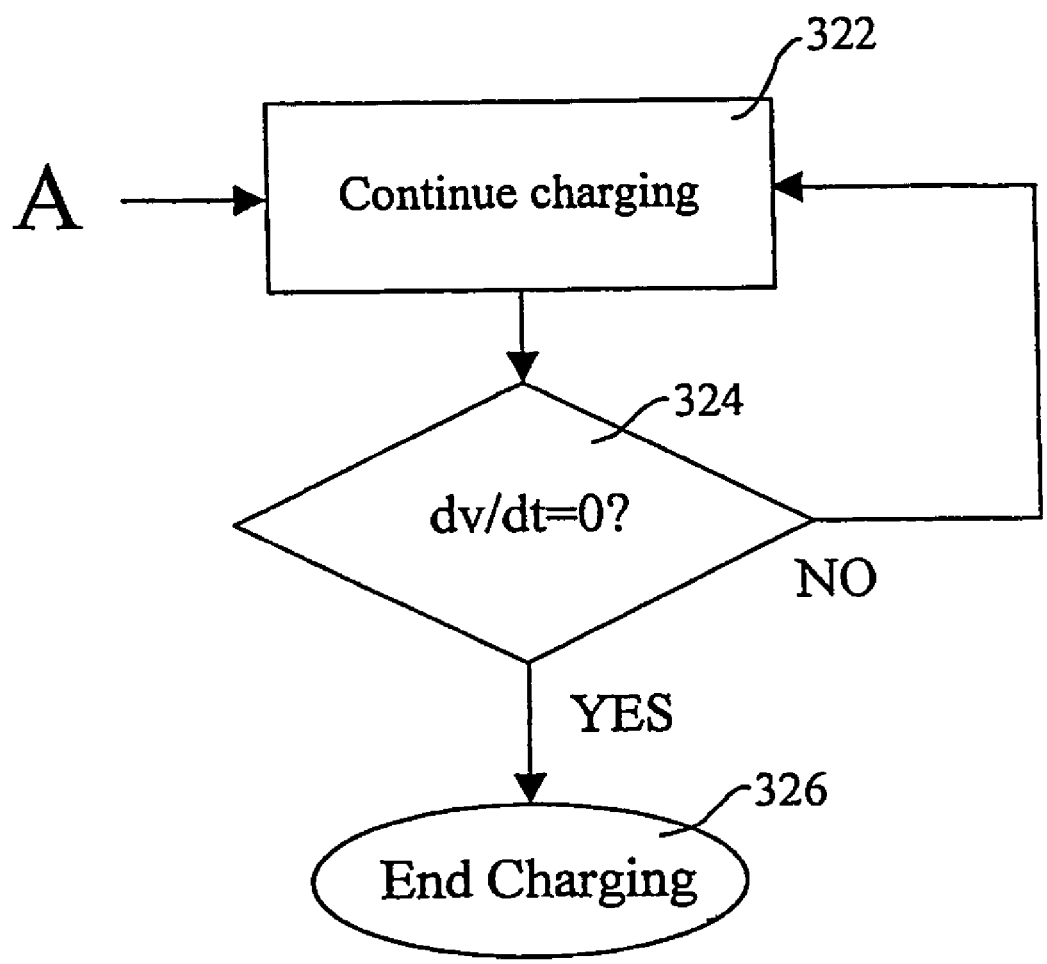

FIGS. 3A and 3B are flow diagrams of a charging process that monitors cell voltage. Steps 302–316 can be the same as steps 202–216. However, in this process charging is not terminated unless certain minimum conditions are satisfied. In the exemplary embodiment, cell voltage is one such minimum condition. At step 318, the cell voltage is monitored. If the cell voltages have reached, say, 2.45 volts per cell, the charging algorithm is terminated at step 320. Alternatively other cell voltages may be utilized for other types of batteries.

If the cell voltage has not reached 2.45 volts per cell, the process branches to letter A in FIG. 3B. In this process, charging defaults to a state that does not terminate the charging process until the first derivative voltage equals zero. Thus, charging continues at step 322. While charging, the first derivative continues to be evaluated at step 324. If the first derivative reaches zero, the charging process is then ended at step 326. If the first derivative does not reach zero, the charging process continues until the first derivative reaches zero and the process is ended.

Figure 4A:
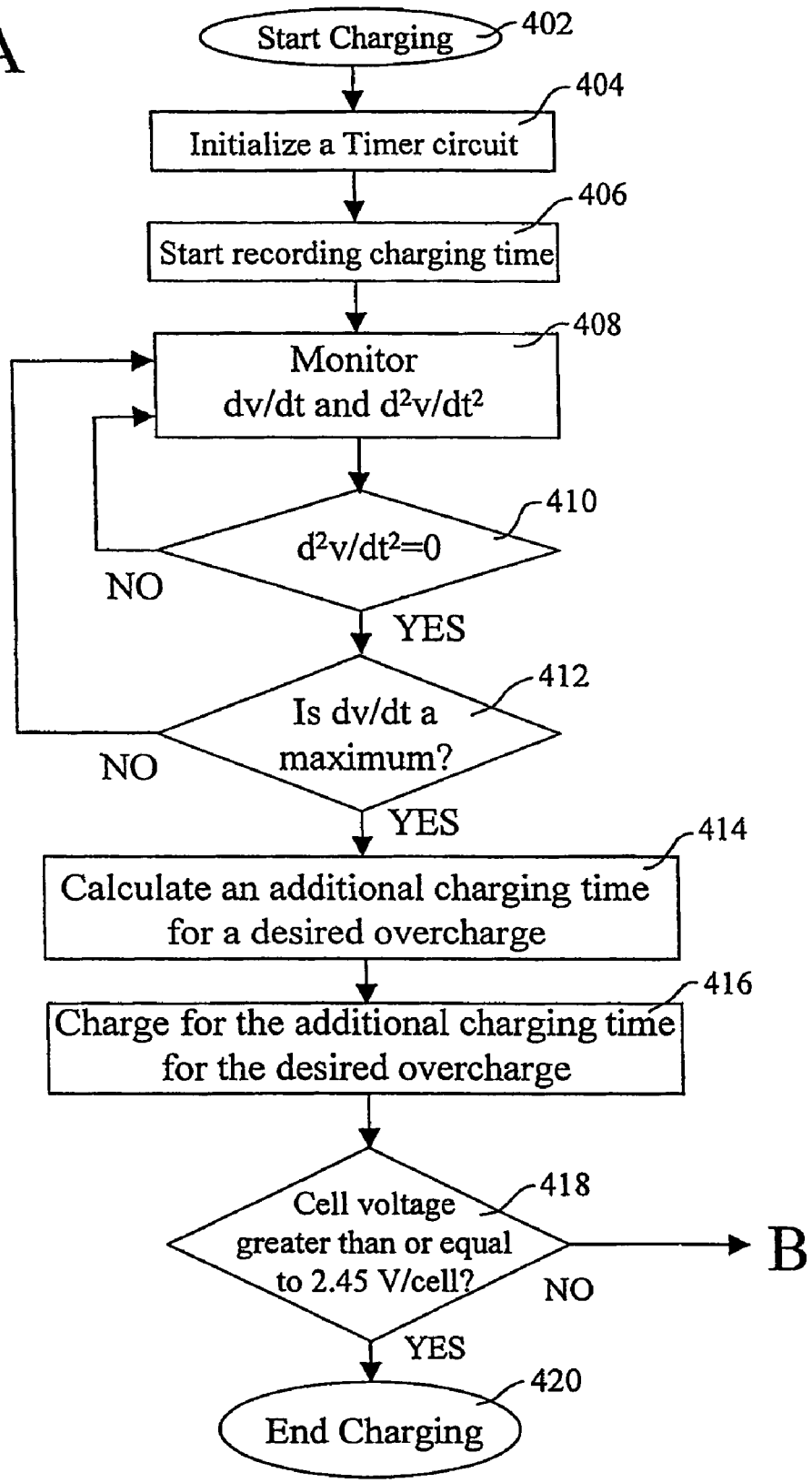
FIGS. 4A and 4B are a flow diagram of an embodiment of a charging process that monitors cell voltage and charging time.
Figure 4B:
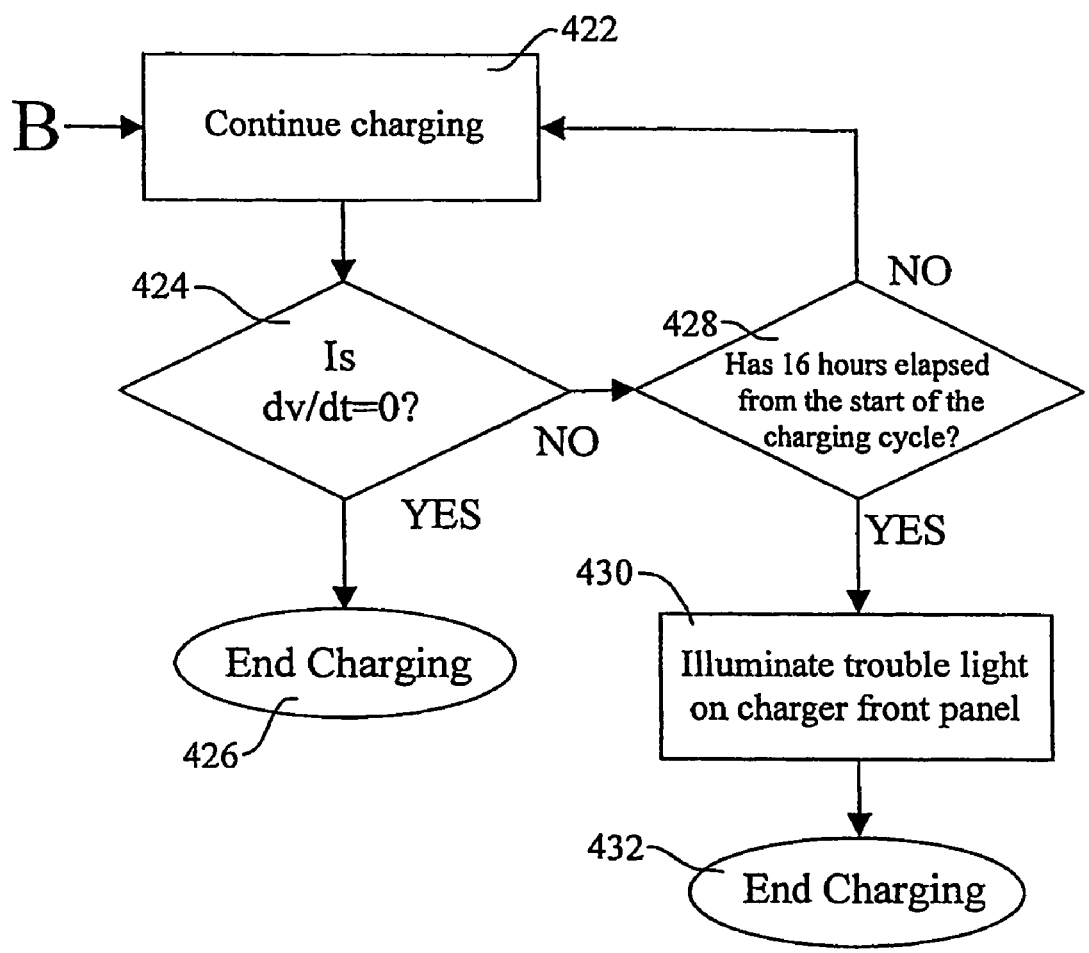

FIGS. 4A and 4B are a flow diagram of a charging process that monitors cell voltage and charging time to produce a desired overcharge. This process is an alternative embodiment of the process of FIG. 3. The process shown in FIG. 4A is analogous to the process of FIG. 3A, and steps 402–426 can be the same as steps 302–326. However, in this process, charging is not terminated unless certain minimum conditions are satisfied. Cell voltage can be one such minimum condition. At step 418, the cell voltage is monitored.

The process shown in FIGS. 4A and 4B provides a further back-up of terminating the charging cycle if charging has not been accomplished in a certain number of hours, as may be deemed desirable in a particular application. In the embodiment described, 16 hours is deemed the maximum number of hours to accomplish a full charge. Alternatively, any time period suitable to prevent damage to a battery may be substituted.

Continuing with FIG. 4B, the charging process continues in step 422 while the first voltage derivative is monitored at step 424. If the first derivative reaches zero, the charging process is ended at step 426. If the first voltage derivative has not reached zero, the process branches to an evaluation step 428 that compares the elapsed charging time to a set time, in this case 16 hours. In an embodiment any suitable time period may be selected as the set time.

If the predetermined charging time has been exceeded, an alarm signal or message may be sent (step 430) visibly, audibly or otherwise to the person in charge of or overseeing the battery recharging process. The message can include information on the identity of the charger of interest, to distinguish it from other chargers which may be present, as when batteries in each of the golf cars in a fleet are being recharged at the same time. Upon activation of the alarm signal by step 430, the charging cycle is terminated at step 432. If at step 428 the predetermined time has not been exceeded, the charging cycle continues.

Figure 5:
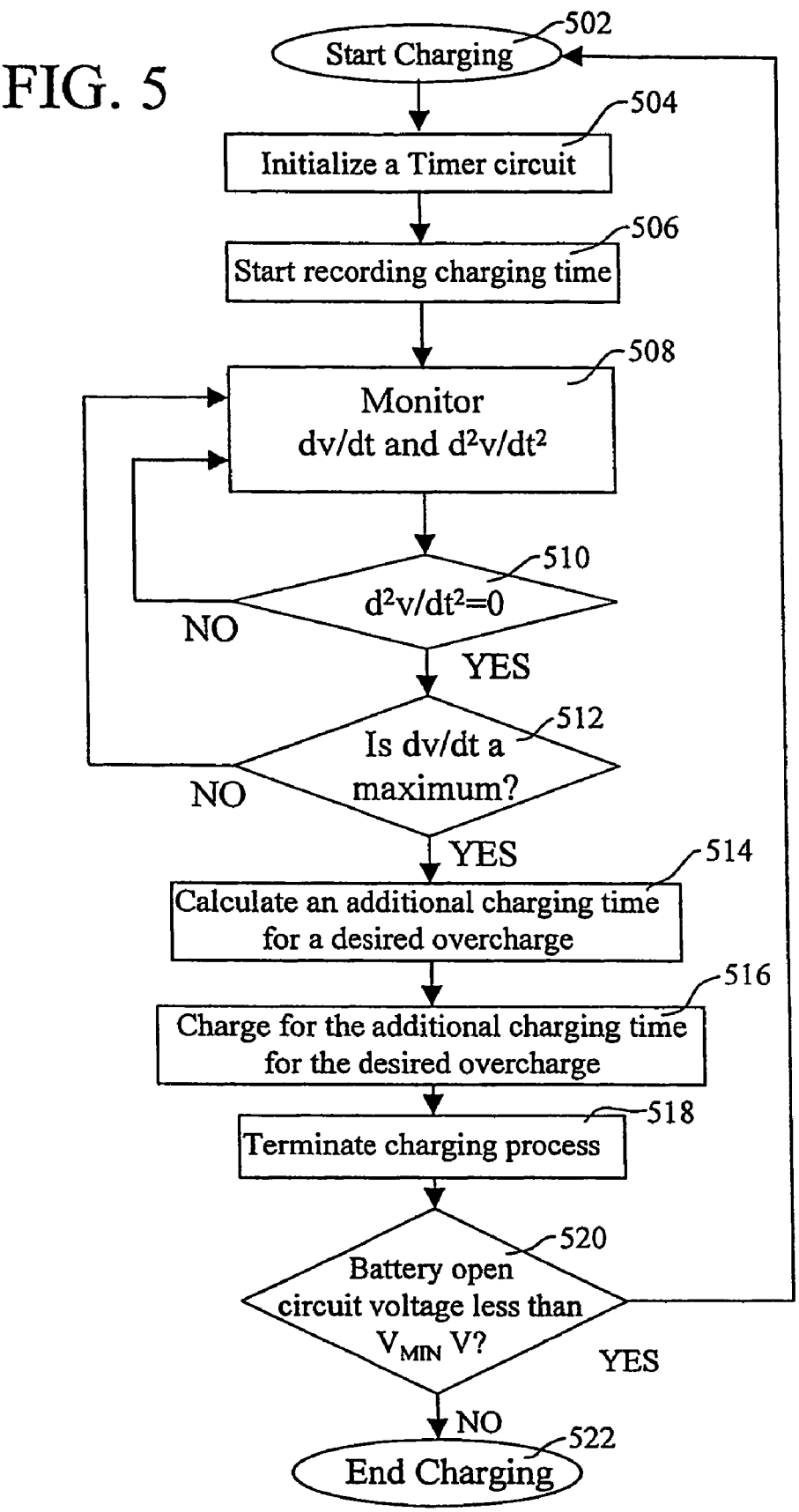
FIG. 5 is a flow diagram of an embodiment of a charging process that provides refresh charging.

FIG. 5 is a flow diagram of a charging process that provides refresh charging. Steps 502–516 can be the same as steps 402–416. The charging process can be terminated at step 518.

While the battery is still connected to the charger, the open circuit voltage of the battery is monitored at step 520. If the battery's voltage falls below a preset minimum value $V_{Min}$, the charging process is caused to be repeated. The voltage $V_{Min}$ is selected to provide a desired lower threshold of voltage that the charger will not allow the battery to drop below. The charger keeps a charge on the battery to keep it above $V_{Min}$. However, as long as the battery remains above the low voltage threshold $V_{Min}$, the charging process will not be reinitiated, and the overall process is stopped at step 522. The value selected for $V_{Min}$ is based upon an amount of acceptable remaining charge that is user selectable, or alternatively programable as a preset value in the charges operating program.

Figure 6:
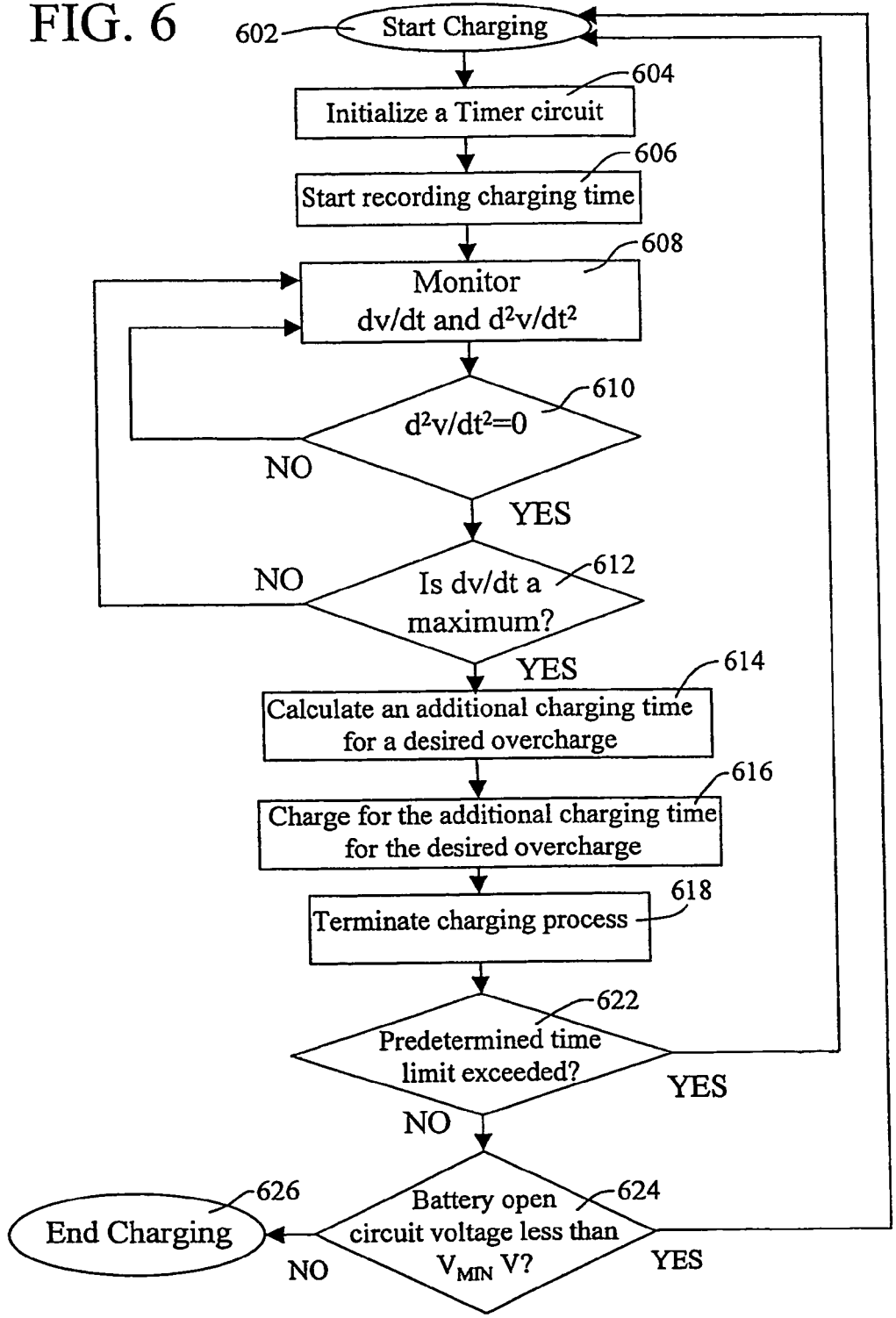
FIG. 6 is a flow diagram of an embodiment of a charging process that monitors time since the termination of charging and battery open circuit voltage.

FIG. 6 is a flow diagram of a charging process that monitors an elapsed time since termination of charging of a battery, and the battery open circuit voltage. Steps 602–618 can be the same as steps 502–518. In this charging process which monitors an elapsed time since termination of charging of a battery, and the battery open circuit voltage, the time elapsed since termination of the charging process is monitored at step 622. If a predetermined amount of time has elapsed since the charging process was terminated and the battery continues to be connected to the charger equipment, then the charging process is reinitiated. If the elapsed time has not exceeded the predetermined amount of time the process proceeds to step 624. If the open circuit voltage is less than its predetermined value $V_{Min}$ then charging is reinitiated. If the battery open circuit voltage remains above $V_{Min}$ then the process is terminated at step 626.

In an alternative process, the open circuit voltage can be monitored prior to evaluating time since termination of the charging process. In a further alternative process, time since termination of the charging process can be monitored simultaneously with monitoring of the battery open circuit voltage.

Figure 7:
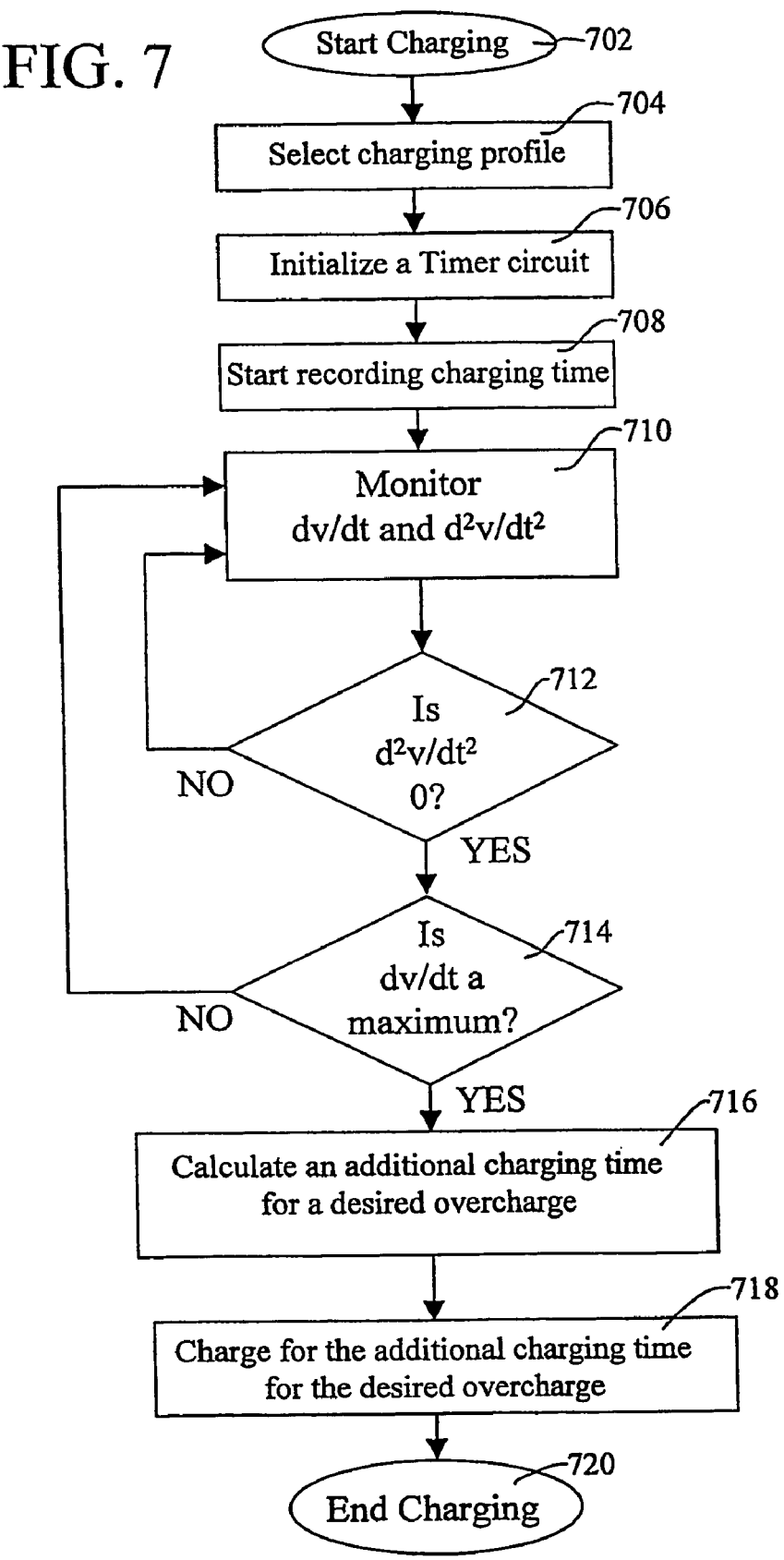
FIG. 7 is a flow diagram of an embodiment of the invention that allows selection of different charging profiles.

FIG. 7 is a flow diagram of a form of the invention that allows the selection of various charging profiles. At step 702 the charging process is initiated. Next, a charging profile is selected 704. Possible charging profiles comprise: constant potential; modified constant potential; constant current; ferro and ferro resonant; constant current-constant potential-constant current IEI); constant power-constant potential-constant current (PEI); and, preferably, constant power. Information describing and defining the different profiles can be contained in an addressable memory included in the charger in association with the control aspects of the charger.

Once a charging profile has been selected, a timer circuit is initialed and the process is at step 706 started utilizing the selected profile. Next, the process begins recording an elapsed time at step 708. The process monitors the first and second derivatives of the voltage at step 710. If the second derivative is equal to zero (step 712) and the first derivative has reached a maximum (step 714), the charging process continues. If the second derivative has not reached zero and the first derivative has not reached the maximum, their values are continuously monitored until they reach the desired values.

Once the desired derivative values have been reached, an additional charging time for a desired overcharge is calculated at step 716, and the battery is charged for an additional charging time for the desired overcharge (step 718). The additional charging time may utilize the previously selected charging profile or another charging profile. Once the additional charging time for the desired overcharge has elapsed, the process is terminated at step 720.

Figure 8:
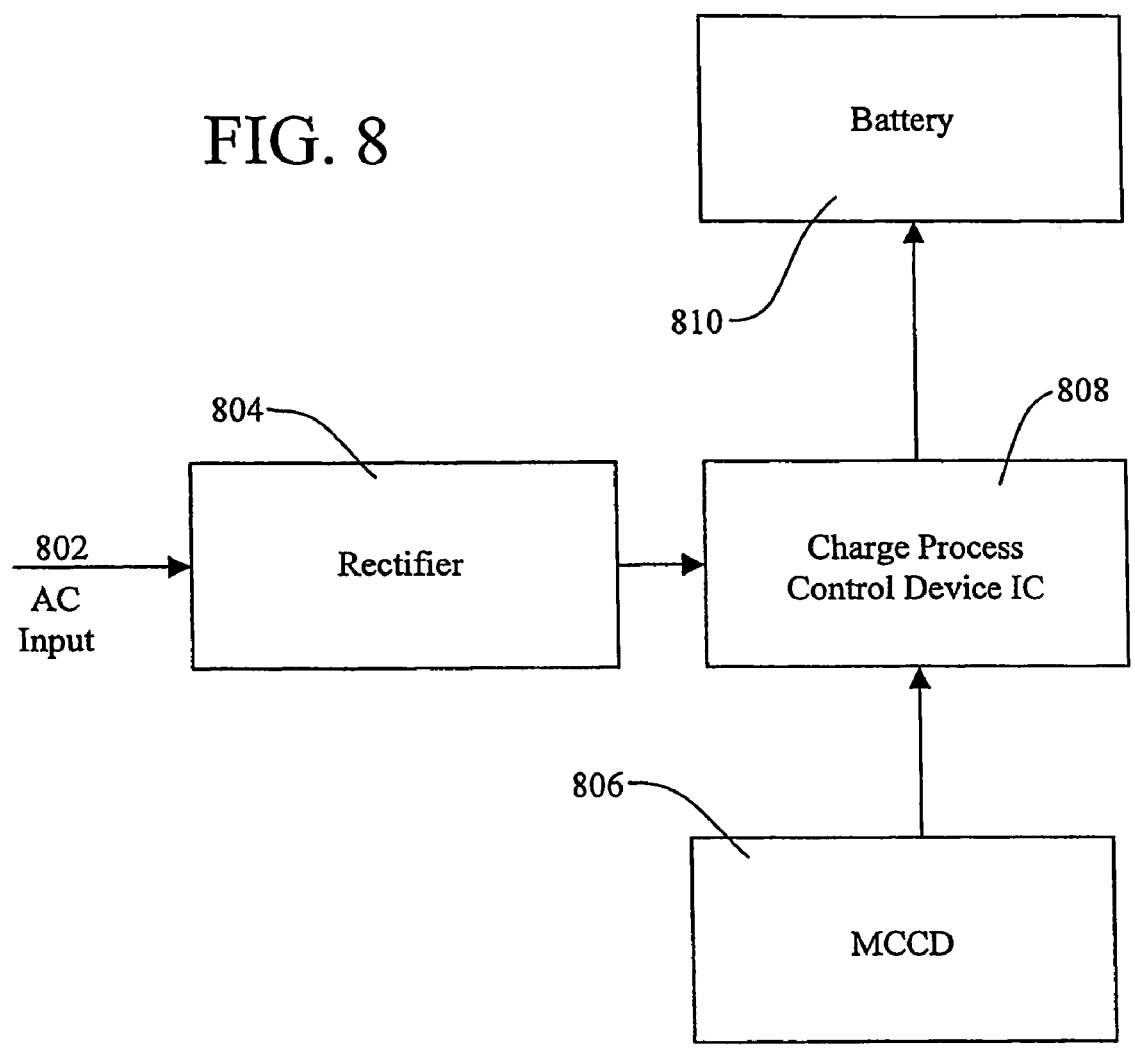
FIG. 8 is a system block diagram of an embodiment of a battery charging system utilizing a charge process control device IC and a measuring computing and control device ("MCCD")

FIG. 8 is a block diagram of an exemplary battery charging system utilizing a charge control algorithm device IC and a "measuring computing and control device" (MCCD) such as a suitably programmed microprocessor. An AC input 802 to rectifier 804 creates a charging current, at a desired voltage, that is applied to battery 810 through a charge process control device integrated circuit 808. The charge process control device integrated circuit 808 controls application of the charging energy to the battery 810.

The charge control device IC 808 functions in conjunction with the MCCD to apply a charging signal comprising one or more charging profiles or processes. Instructions to implement one or more of the processes described in FIGS. 2 through 7 can be stored in the MCCD 806. Typically storage is achieved by loading a set of program instructions describing the process into the MCCD. Alternatively, the process may be integrated into a custom charge process control integrated circuit which may include the features and functions of integrated circuit 808.

Figure 9:
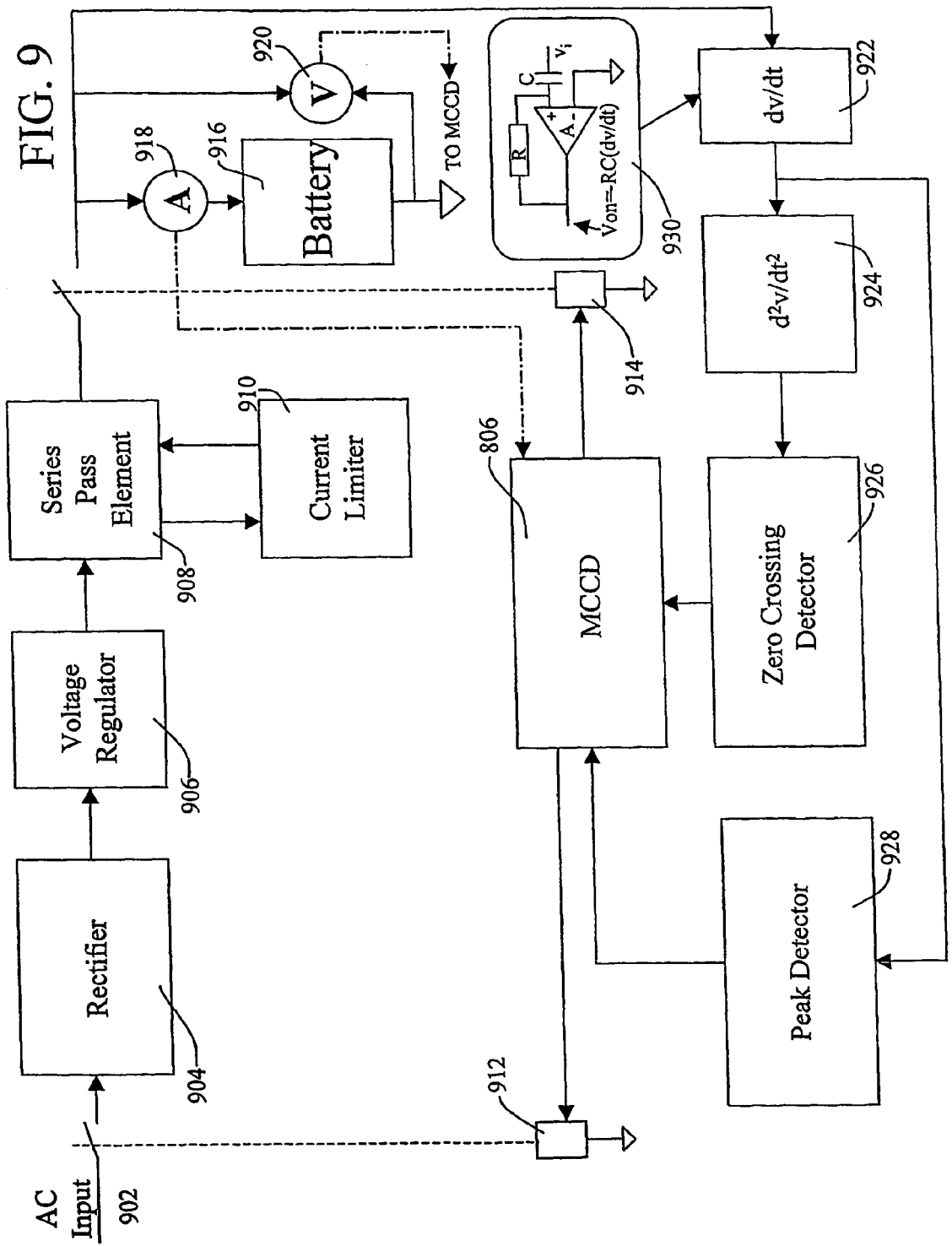
FIG. 9 is a block diagram of an embodiment of a battery charger utilizing an embodiment of the invention's process to charge a battery.

FIG. 9 is a block diagram of a battery charging system capable of implementing one or more of the invention's charging processes to charge a battery. An AC input 902 is controlled by relay 912. The AC power is applied to rectifier 904 to produce a DC voltage having a ripple component. Voltage regulator 906 reduces the variations in the DC voltage. The regulated DC voltage is applied to a conventionally constructed series pass element 908 that works in conjunction with a conventionally constructed current limiting device 910 to supply a desired current and voltage through the contacts of a relay 914 to battery 916. Current applied to the battery is monitored by a conventional ampere meter 918. The ampere meter monitors the instantaneous value of current flowing in a conductor. In an alternative arrangement, a conventional averaging ampere meter can be used to indicate an average charge passing through the conductor. In a further alternative arrangement a conventional totalizing ampere meter can be used to provide an indication of the total charge passing through the conductor. Voltage across the battery terminals is monitored by volt meter 920. Information obtained from the ampere meter and the volt meter can be supplied to MCCD 806.

The voltage across the battery 916 is also supplied to a differentiator circuit 922 that computes the first derivative of the voltage. Such a circuit may be conventionally constructed as shown at 930. A differentiator typically comprises an operational amplifier A, a resistor R and a capacitor C, connected as known by those skilled into the art to produce a differentiator. A voltage $V_i$ is applied to the input of the differentiator. The signal output $V_o$ is equal to $-RC(dV/dt)$.

The output of the first derivative circuit 922 is fed into a peak detector 928. When a maximum first derivative signal is detected, an indication is provided to MCCD 806. The output of the first derivative processing circuit is also fed to a second derivative processing circuit 924. This circuit is simply a replica of the circuit in 922. The output of the second derivative circuit 924 is fed to a zero crossing detector 926. A zero crossing detector is a circuit that detects a transition in signal polarity, such as when a voltage goes from positive to negative and by necessity crosses through a value of zero volts. Detection of a zero crossing corresponding to the detection of inflection point 115 in voltage curve 101 of FIG. 1 is sought. An indication of the detection of a zero crossing is provided to the MCCD 806. Under control of the process comprising an embodiment of the invention, the MCCD directs a charging current and voltage to be applied through relay 914. The MCCD also can control the operation of the AC input through relay 912.

It is preferred that the components of the charging system depicted in FIG. 9 be housed in a common charger housing. The charger can be, usually is, separate from the battery or thing (e.g., golf car) in which the battery is located. However, if desired, some or all of the components of the charging system can be physically associated with the battery as elements of, e.g., a golf car.

It will be seen that this invention provides equipment and procedures for charging a flooded lead acid battery of the deep cycle type in ways which charge the battery effectively yet without overly charging the battery to extents which reduce battery life. The battery is overcharged by an amount which is a selected percentage of the charging energy required to place the battery in a state of full charge following completion of its last preceding duty cycle. A recharging event achieved in the practice of this invention inherently allows for and takes into consideration factors such as the battery, age and internal characteristics which impact charging effectiveness and efficiency.

While the invention has been described above with reference to recharging a battery, it will be understood that the invention also applies to the recharging of a set of batteries which may be encountered in an electric golf car or some other electrically powered vehicle or device, or with a set of batteries used in connection with a photovoltaic electrical power system, for example.

The foregoing description of preferred and other embodiments and forms of the invention has been presented by way of example, not as a catalog of all forms which equipment or procedures in which the invention can be manifested or used to advantage. Workers skilled in the art to which the invention pertains will understand that variations and modifications of the described equipment and processes can be used beneficially without departing from the scope of the invention.

The invention claimed is:

1. A method for charging flooded deep cycle lead acid batteries comprising the steps of:
   applying charging energy to such a battery;
   monitoring the charging energy as to quantity delivered to the battery and its $dv/dt$ and $d^2v/dt^2$ aspects; by use of information about a first amount of charging energy delivered to the battery to a point in the process when $dv/dt$ is a maximum and $d^2v/dt^2=0$, determining at that point and delivering to the battery beyond that point a defined quantity of charging energy additive to said first amount adequate to overcharge the battery to a predetermined extent related to said first amount.

2. A method for charging flooded deep cycle lead acid batteries comprising the steps of:
   applying to such a battery a first amount of charging energy adequate, in combination with an initial charge condition of the battery, to cause the battery to attain a detectable charge state which is less than a full charge condition and which has a known relation to a full charge condition, and
   applying to the battery a further second increment of charging energy which is adequate, in combination with the initial charge condition and the first amount of charging energy, to overcharge the battery to a selected extent and the quantity of which is determined as a selected percentage of the first amount of charging energy when the detectable charge state is attained.

3. The method as claimed in claim 2 in which the detectable charge state is the state at which the battery is at substantially 98% of full charge.

4. The method as claimed in claim 3 in which the step of determining the amount of the further second increment of charging energy includes:
   dividing a) the product of (i) first amount of charging energy and (ii) the sum of unity (one) and the decimal equivalent of the percent of overcharge by b) 0.98.

5. The method as claimed in claim 4 in which the step of determining the amount of the second increment of charging energy further includes determining the difference between a) the result of the division operation described in claim 4 and b) the first amount of charging energy.

6. The method as claimed in claim 2 in which the detectable charge state is detected by:
   determining when the rate of change of an applied charging voltage with respect to time ($dv/dt$) is a maximum; and
   determining when the acceleration of the applied charging voltage with respect to time ($d^2v/dt^2$) is zero.

7. A method for charging deep cycle lead acid batteries comprising:
   applying charging energy to such a battery;
   detecting a point of 98% of full charge in the charging process;
   monitoring the charging energy provided in amp hours to attain the 98% full charge point;
   determining the remaining charging energy to be applied to fully charge the battery and to overcharge the battery by an amount substantially equal to a predetermined percentage of the quantity of energy applied to the battery from the commencement of charging to the 98% full charge point of the battery; and
   applying the remaining charging energy to the battery.

8. The method of claim 7 for charging a deep cycle lead acid battery wherein the step of detecting the 98% full charge point comprises:
   determining when the rate of change of an applied charging voltage with respect to time ($dv/dt$) is a maximum; and
   determining when the acceleration of the applied charging voltage with respect to time ($d^2v/dt^2$) is zero.

9. Apparatus for charging flooded deep cycle lead acid batteries which includes a DC source, a mechanism operable to measure the amount of charging energy delivered to a battery from the beginning of a battery charging event, and a mechanism operative for detecting when a battery being charged by the apparatus is at a detectable point in a charging event at which the battery has a certain state of charge less than full charge and for determining at that point and controlling the application to the battery beyond that point of a further quantity of charging energy effective to overcharge the battery by a selected percentage of the amount of charging energy delivered to the battery to that detectable point in that charging event.

10. Apparatus as claimed in claim 9 further including:
   a $dv/dt$ measurement circuit, a
   $d^2v/dt^2$ measurement circuit, and
   a controller coupled to the $dv/dt$ and $d^2v/dt^2$ measurement circuits, the controller being configured for detecting the point in a battery recharge event at which $dv/dt$ is a maximum and $d^2v/dt^2=0$, and at which the battery is at substantially a certain percentage of full charge, and for determining the value of $Q_D$ from the relation $Q_S/p = Q_D/(1+x)$ in which $Q_S$ is the ampere-hours of charging energy delivered to the battery in the interval from the beginning of the recharge event to the detected point, p is the decimal equivalent of the certain percentage, x is the decimal equivalent of a desired percentage amount of replenishment charge to be delivered to the battery as an overcharge amount, and $Q_D$ is the total amount of charging energy to be delivered to the battery from the beginning of the recharge event to the end of that event.

11. Apparatus according to claim 10 in which the value of p is substantially 0.98.

12. Apparatus according to claim 10 in which x is in the range of from about 0.08 to about 0.12.

* * * * *